(12) United States Patent
Morita et al.

(10) Patent No.: US 6,298,170 B1
(45) Date of Patent: Oct. 2, 2001

(54) IMAGE TRACKING APPARATUS FOR TRACKING AN IMAGE WITHIN A LOCAL REGION TO CONTINUOUSLY TRACK A MOVING OBJECT

(75) Inventors: Toshihiko Morita; Naoyuki Sawasaki, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/783,056

(22) Filed: Jan. 14, 1997

(30) Foreign Application Priority Data

Jul. 23, 1996 (JP) .................................................. 8-193469

(51) Int. Cl.[7] .............................................. G06K 15/316
(52) U.S. Cl. ......................... 382/278; 382/103; 382/170; 382/236; 348/169
(58) Field of Search .................................... 382/278, 103, 382/104, 236, 170; 348/169; 345/358

(56) References Cited

U.S. PATENT DOCUMENTS

| | | | |
|---|---|---|---|
| 4,547,800 | * 10/1985 | Masaki | 348/90 |
| 4,550,437 | * 10/1985 | Kobayashi et al. | 382/41 |
| 4,817,175 | * 3/1989 | Tenenbaum et al. | 358/21 |
| 4,864,629 | * 9/1989 | Deering | 382/216 |
| 4,908,751 | * 3/1990 | Smith | 364/200 |
| 4,958,224 | * 9/1990 | Lepore et al. | 358/125 |
| 5,020,113 | 5/1991 | Lo et al. | 382/42 |
| 5,226,095 | * 7/1993 | Okumura et al. | 382/151 |
| 5,285,273 | * 2/1994 | James et al. | 358/125 |
| 5,341,143 | * 8/1994 | Reis et al. | 342/64 |
| 5,355,163 | * 10/1994 | Tomitaka | 348/234 |
| 5,576,950 | * 11/1996 | Tonomura et al. | 386/121 |
| 5,592,573 | * 1/1997 | Eisenbarth et al. | 382/294 |
| 5,647,015 | * 7/1997 | Choate et al. | 382/103 |
| 5,946,041 | * 8/1999 | Morita | 348/416 |

FOREIGN PATENT DOCUMENTS

| | | |
|---|---|---|
| 2938853 A1 | 4/1981 | (DE) . |
| 3447930 C1 | 4/1996 | (DE) . |
| 19724481 A1 | 12/1997 | (DE) . |
| 0 634 665 | 1/1995 | (EP) . |
| 8-147477 | 6/1996 | (JP) . |

* cited by examiner

*Primary Examiner*—Matthew C. Bella
*Assistant Examiner*—Sheela Chawan
(74) *Attorney, Agent, or Firm*—Staas & Halsey LLP

(57) ABSTRACT

A local region image tracking apparatus continuously tracks an arbitrary local region within a search image which is described by search image data by comparing the search image data and reference image data related to the arbitrary local region having a size of am pixels by bn pixels with respect to input image data, where the search image has a size larger than am pixels by bn pixels, and a, b, m and n are natural numbers. The local region image tracking apparatus includes correlation computing circuit for computing a correlation between reference image data related to a reference image having a size of m pixels by n pixels and the search image data a plurality of times while moving a position of the reference image with respect to the search image, and for outputting correlation values respectively indicating a computed correlation, and a correlation value accumulating circuit for accumulating the correlation values output from the correlation computing circuit, and for outputting a correlation value indicative of a correlation between the search image data and reference image data related to an equivalent of a reference image having a size of am pixels by bn pixels.

15 Claims, 23 Drawing Sheets

FIG. 9

| ROM ADDRESS (5bit) | INPUT IMAGE MEM SELECT SIGNAL (2bit) | SEARCH IMAGE MEM SELECT SIGNAL (2bit) | REF IMAGE MEM SELECT SIGNAL (2bit) |
|---|---|---|---|
| 2 | 2 | 0 | 1 |
| 3 | 0 | 2 | 1 |
| 4 | 1 | 0 | 2 |
| 5 | 0 | 1 | 2 |
| 8 | 2 | 1 | 0 |
| 9 | 1 | 2 | 0 |
| 12 | 0 | 1 | 2 |
| 13 | 1 | 0 | 2 |
| 16 | 1 | 2 | 0 |
| 17 | 2 | 1 | 0 |
| 18 | 0 | 2 | 1 |
| 19 | 2 | 0 | 1 |

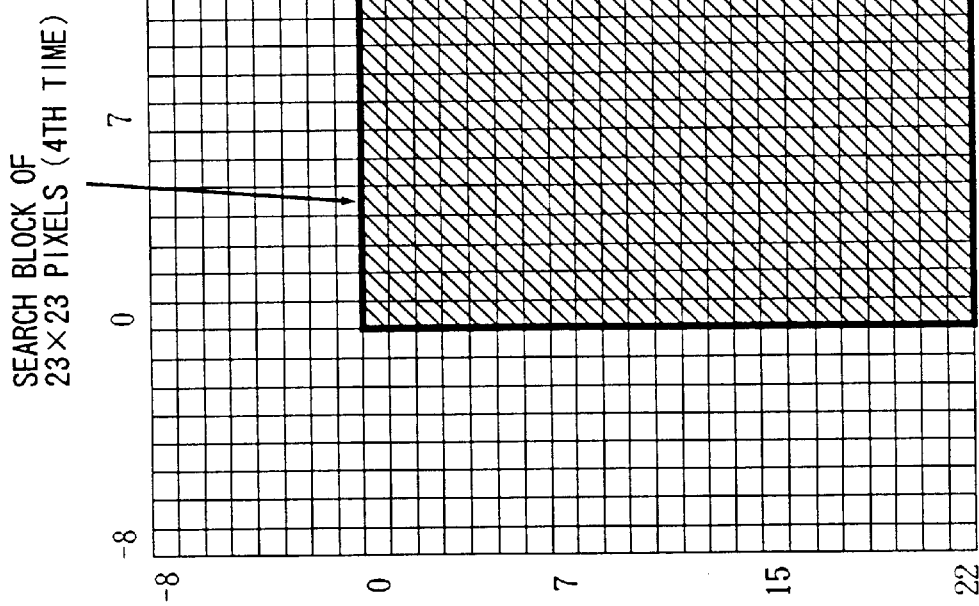
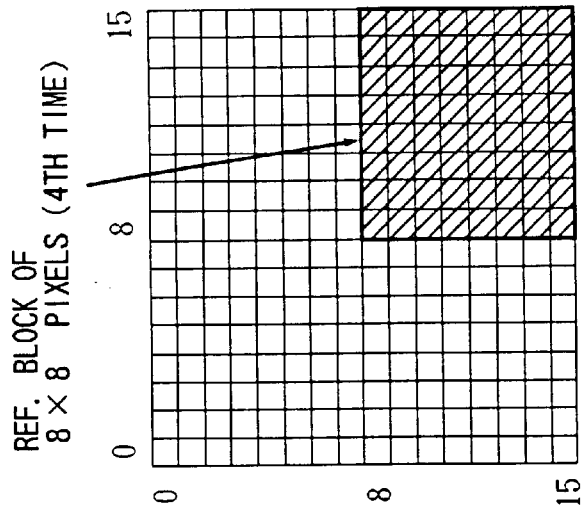

IMAGE TRACKING APPARATUS FOR TRACKING AN IMAGE WITHIN A LOCAL REGION TO CONTINUOUSLY TRACK A MOVING OBJECT

BACKGROUND OF THE INVENTION

The present invention generally relates to image tracking apparatuses, and more particularly to an image tracking apparatus which tracks an image within a local region and is suited for continuously tracking a moving object within an image which is picked up by a television camera or the like.

An image tracking apparatus which tracks an image within a local region (hereinafter simply referred to as a "local region image tracking apparatus") by tracking a moving object within a picked up image is used in various systems. Examples of such systems are systems which make a non-contact type measurement of motion without the use of an acceleration sensor or visualize motion vectors, systems which make automatic supervision or monitoring, systems which recognize human gesture, expression or line of vision, systems which control cameras when making a movie or broadcasting a sports program, systems which control moving robots or self-controlled vehicles, and systems which track moving objects from a satellite.

FIG. 1 is a system block diagram showing a part of an example of a conventional local region image tracking apparatus. In FIG. 1, the local region image tracking apparatus generally includes an image pickup device 501, an analog-to-digital (A/D) converter 502, a search image memory 503, a reference image memory 504, a correlation computing unit 505, an address generator 506, and a correlation value peak position detector 507.

Analog image data related to an image that is picked up by the image pickup device 501 are converted into digital image data by the A/D converter 502, and are successively stored in the search image memory 502. The reference image memory 504 prestores fixed reference image data related to a predetermined object which is to be tracked. The correlation computing unit 505 carries out a correlation computation to obtain a correlation value which indicates the correlation between the image data within the search image memory 503 and the reference image data within the reference image memory 504. The correlation value peak position detector 507 detects a peak position of this correlation value, that is, a position having a highest correlation within the picked up image. The peak position from the correlation value peak position detector 507 is fed back to the address generator 506, and the address generator 506 generates a memory address corresponding to the peak position and supplies this memory address to the search image memory 503 and the reference image memory 504. Accordingly, the peak value of the correlation value is always obtained from the correlation value peak position detector 507, and it is possible to track the predetermined object within the picked up image in real-time based on this peak position.

In other words, as shown in FIG. 2, the correlation computing unit 505 computes the correlation between a reference image (hereinafter referred to as a reference block) R which is a local image within a certain frame f and a candidate block C which is a local image of the same size within another frame g, and repeats this computing operation while changing the position of the candidate block C within a search image (hereinafter referred to as a search block) S. As a result of this correlation computing operation, it is possible to calculate a moving quantity of the reference block R between the two frames f and g from the position of the candidate block C where the correlation value becomes a maximum. By repeating such an operation, it is possible to track the moving object within the picked up image.

The correlation computing operation can be described by the following formula, where "D" denotes a correlation value between the reference block R and the candidate block C, "u, v" denotes a moving quantity of the reference block R that makes the correlation value D a minimum, the reference block R and the candidate block C respectively have a size of m pixels x m pixels, "p, q" denotes a moving quantity of the candidate block C within the search block S as shown in FIG. 2, $-p \leq u$, and $v \leq q$.

$$D(u, v) = \sum_{x=1}^{m} \sum_{y=1}^{m} |S(u+x, v+y) - R(x, y)|$$

The above formula calculates the absolute value of the sum of the differences between the two local images. For this reason, the smaller this sum, that is, the smaller the correlation value D, the higher the correlation between the reference block R and the candidate block C.

The correlation computing operation requires a large amount of calculations, and it is desirable for the correlation computing unit 505 to employ a parallel pipeline processing. FIG. 3 shows an example of the correlation computing unit 505 for m=4. In FIG. 3, an operation element is denoted by PE, an adder element is denoted by A, and a delay element such as a flip-flop is denoted by d. The correlation computing unit 505 shown in FIG. 3 generally includes delay elements 601 through 612, operation elements 621 through 624, 631 through 634, 641 through 644 and 651 through 654, and adder elements 661 through 664 which are connected as shown.

The delay elements 601 through 612 are provided in order to match timings. Each of the operation elements 621 through 624, 631 through 634, 641 through 644 and 651 through 654 calculate the portion of the above described formula within the absolute value signs, and it is assumed for the sake of convenience that the image data of the reference block are stored therein. In other words, the image data of the reference block are stored one pixel at a time in the operation elements 621 through 624, 631 through 634, 641 through 644 and 651 through 654, and by inputting the image data of the search block one pixel at a time from an input line 600, it is possible to successively output the correlation value D(u, v) from an output line 670. By using m×m operation elements (4×4=16 in this particular example), it is possible to carry out the process of tracking the moving object within the picked up image at a high speed.

However, the conventional local region image tracking apparatus which uses the correlation computing unit having the construction described above has the following problems.

First, because the size of the reference block is determined by the number of operation elements forming the correlation computing unit, there was a problem in that the size of the reference block is fixed depending on the correlation computing unit used. For example, when the correlation computing unit includes 256 operation elements, the size of the reference block is fixed to 16 pixels×16 pixels. However, if the image pattern to be tracked is relatively large, the reference block having the size of 16 pixels×16 pixels is too small, thereby making it difficult to carry out a satisfactory tracking process. In addition, although it is possible to increase the number of operation elements forming the correlation computing unit in order to increase the size of the reference block, there is a problem in that the scale of the circuit becomes too large in this case.

Second, there is a problem in that the conventional local region image tracking apparatus can only process black-and-white images. As a method of processing a color image, it is conceivable to provide one correlation computing unit in each of three systems for the three primary colors red, green and blue, for example, and adding outputs of the correlation computing units in the three systems. But this conceivable method is problematic in that the scale of the circuit becomes large because of the need to provide one correlation computing unit in each of the three systems.

Third, even if the reference block to be used has a size on the order of 16 pixels×16 pixels, the correlation computing unit requires 256 operation units. As a result, there is a problem in that there is insufficient marginal space to provide, in addition to the correlation computing unit, peripheral circuits such as an address counter and a data selector on one integrated circuit, and that the peripheral circuits or the like must be provided as external or externally connected circuits. For this reason, the local region image tracking apparatus as a whole is made up of a plurality of printed circuit boards, for example, and it is difficult to cope with the needs such as reducing the size of the apparatus and reducing the cost of the apparatus.

SUMMARY OF THE INVENTION

Accordingly, it is a general object of the present invention to provide a novel and useful local region image tracking apparatus in which the problems described above are eliminated.

Another and more specific object of the present invention is to provide a local region image tracking apparatus which can cope with a relatively large reference block, can process color images, and can reduce the scale of the circuit of the apparatus as a whole, including peripheral circuits, so that the apparatus is suited for being made in the form of an integrated circuit.

Still another object of the present invention is to provide a local region image tracking apparatus for continuously tracking an arbitrary local region within a search image which is described by search image data by comparing the search image data and reference image data related to the arbitrary local region having a size of am pixels by bn pixels with respect to input image data, where the search image has a size larger than am pixels by bn pixels, a, b, m and n are natural numbers, and the local region image tracking apparatus comprises correlation computing means for computing a correlation between reference image data related to a reference image having a size of m pixels by n pixels and the search image data a plurality of times while moving a position of the reference image with respect to the search image, and for outputting correlation values respectively indicating a computed correlation, and correlation value accumulating means for accumulating the correlation values output from the correlation computing means, and for outputting a correlation value indicative of a correlation between the search image data and reference image data related to an equivalent of a reference image having a size of am pixels by bn pixels. According to the local region image tracking apparatus of the present invention, it is possible to cope with a relatively large reference image. In addition, it is also possible to process color images.

Furthermore, the circuit scale of the entire apparatus including peripheral circuits can be made small, thereby suiting the apparatus to be made in the form of an integrated circuit.

Other objects and further features of the present invention will be apparent from the following detailed description when read in conjunction with the accompanying drawings.

BRIEF DESCRIPTION OF THE DRAWINGS

FIG. 9 is a diagram showing the relationship of the values of the 5-bit address signal supplied to the ROM and the values of selection data read from the ROM;

FIGS. 18A and 18B respectively are diagrams for explaining the mechanism of realizing the equivalent of the reference block having the size of 16 pixels×16 pixels by accumulating the correlation computation results which are obtained using the reference block having the size of 8 pixels×8 pixels;

DESCRIPTION OF THE PREFERRED EMBODIMENTS

Figure 1:
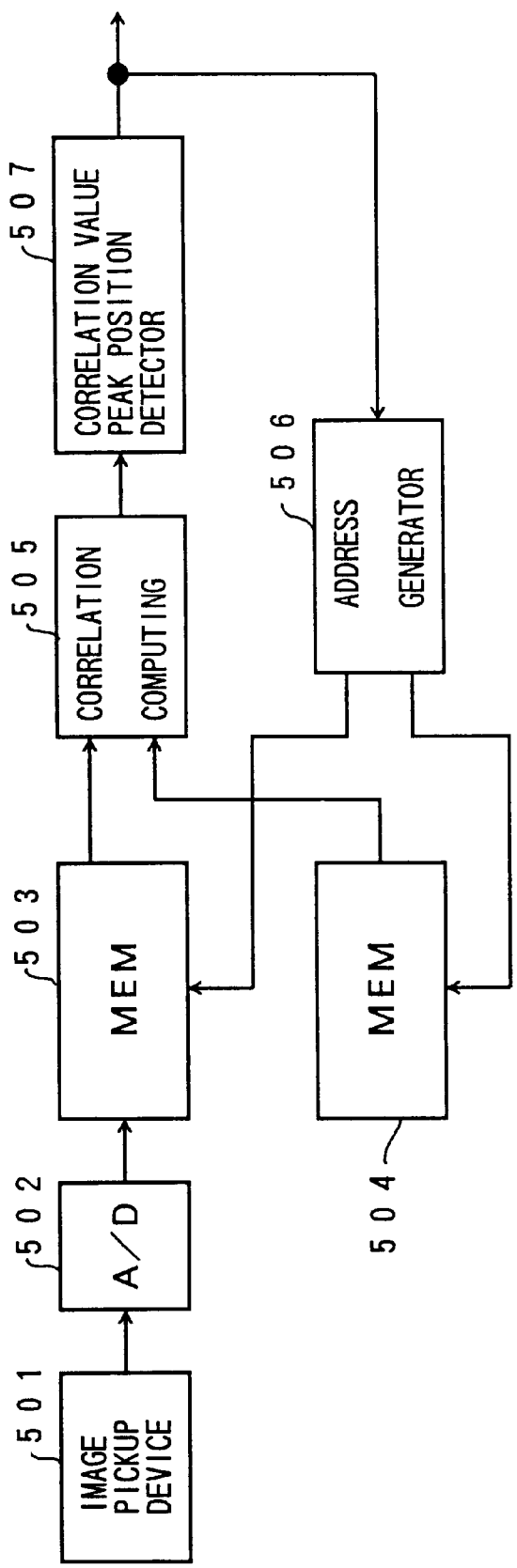
FIG. 1 is a system block diagram showing an example of a part of a conventional local region image tracking apparatus.
Figure 2:
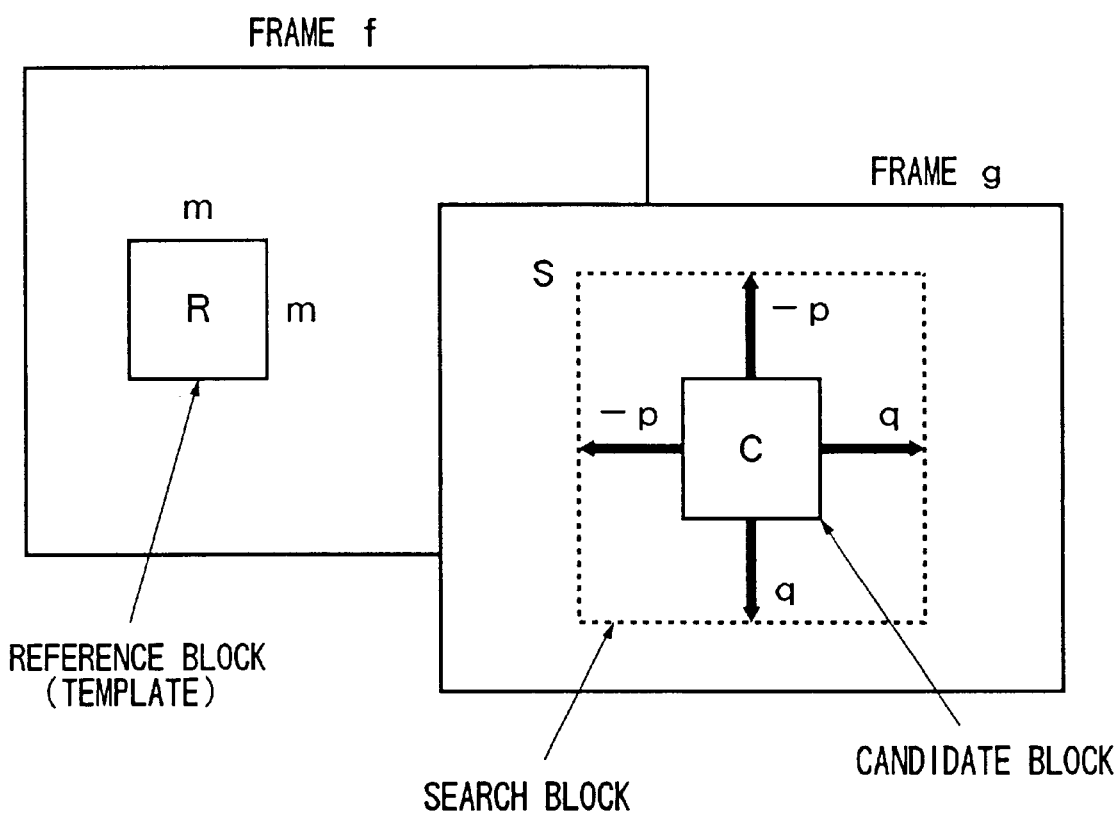
FIG. 2 is a diagram for explaining the relationship of a reference block and a search block used in the conventional local region image tracking apparatus.
Figure 3:
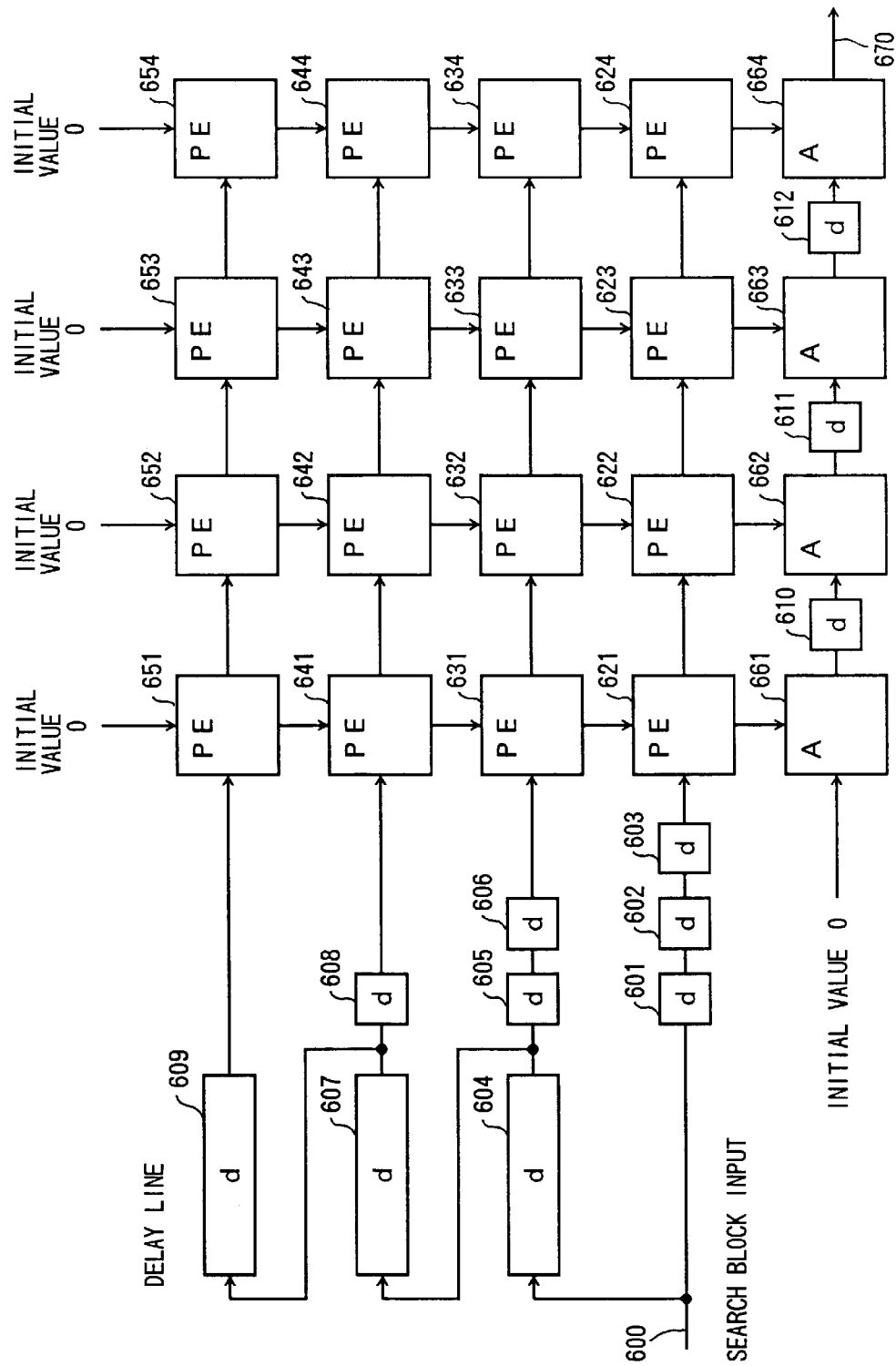
FIG. 3 is a system block diagram showing the construction of a conventional correlation computing unit for a case where m=4.
Figure 4:
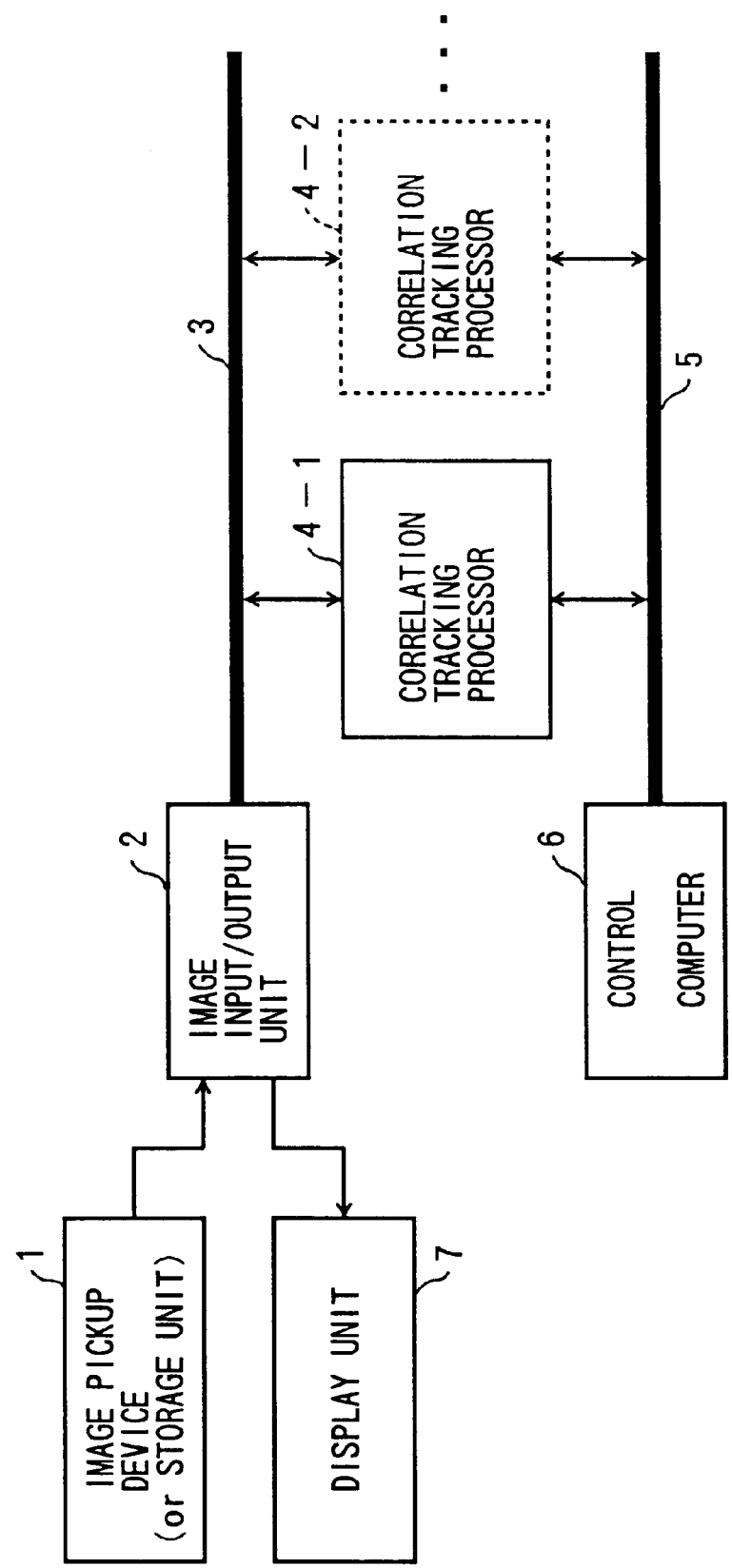
FIG. 4 is a system block diagram showing the general construction of a first embodiment of a local region image tracking apparatus according to the present invention.

FIG. 4 is a system block diagram showing the general construction of a first embodiment of a local region image tracking apparatus according to the present invention.

In FIG. 4, the local region image tracking apparatus generally includes an image pickup device 1 such as a camera, an image input/output unit 2, a plurality of correlation tracking processors 4-1, 4-2, . . . which are coupled to the image input/output unit 2 via a video bus 3, a control bus 5, a control computer 6, and a display unit 7 which is connected to the image input/output unit 2. In other words, the plurality of correlation tracking processors 4-1, 4-2, . . . are coupled in parallel with respect to the image input/output unit 2 via the video bus 3, and these correlation tracking processors 4-1, 4-2, . . . are coupled in parallel with respect to the control computer 6 via the control bus 5. The correlation tracking processors 4-1, 4-2, . . . respectively have the same construction. The control computer 6 controls each of the correlation tracking processors 4-1, 4-2, . . . by carrying out processes such as specifying a position of a target to be tracked via the control bus and reading a motion vector which is obtained as a result of the processing.

In this embodiment, input image data from the image pickup device 1 are input to the image input/output unit 2. However, it is of course possible to use a storage unit 1 in place of the image pickup device 1. In this case, the storage unit 1 is made up of a recording medium such as a video disk, a magnetic disk and a CD-ROM, a memory such as a RAM, a ROM, an EPROM and an EEPROM, a magnetic or optical card or the like. The input image data read from the storage unit 1 are input to the image input/output unit 2. Furthermore, the input image data may be received from a transmitting source via a communication line and input to the image input/output unit 2.

For example, the image input/output unit 2 may include an analog-to-digital (A/D) converter, a digital-to-analog (D/A) converter, and a decoder circuit which decodes compressed image data and the like. The image input/output unit 2 has a function of converting the data format of the input image data input from the image pickup device 1 into a data format suited for the processing in the correlation tracking processors 4-1, 4-2, . . . , and a function of converting the data format of the image data into a data format suited for display on the display unit 7. In other words, the image input/output unit 2 carries out an A/D conversion in the A/D converter when the input image data are input from the image pickup device 1, and carries out a decoding when the input image data are read from the storage unit 1. Further, the image data to be displayed on the display unit 7 are subjected to a D/A conversion in the D/A converter if necessary. Of course, it is not essential to provide the display unit 7, and it is possible to simply use the result of the processing.

Figure 5:
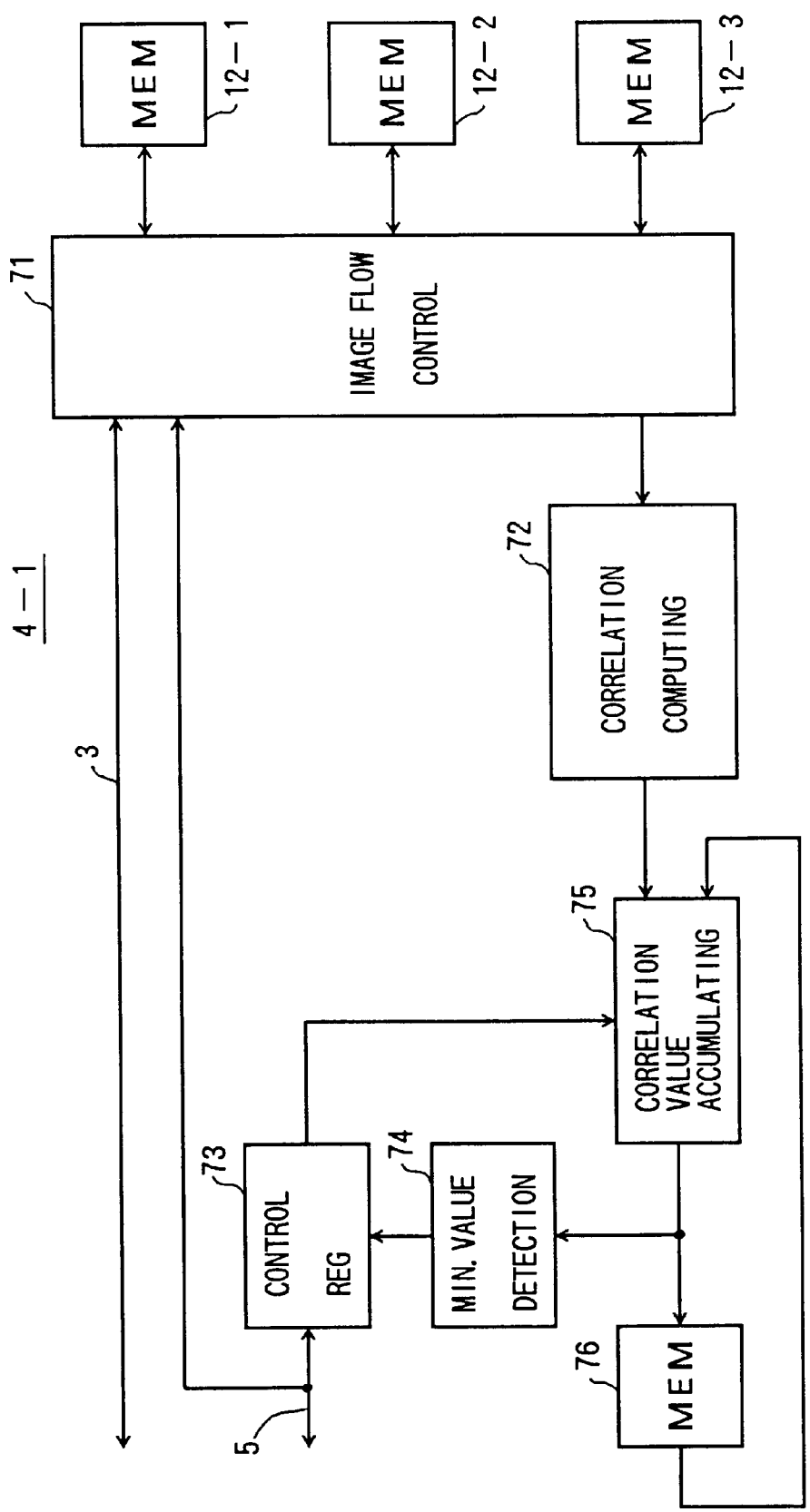
FIG. 5 is a system block diagram showing an embodiment of the construction of a correlation tracking processor of the first embodiment.

FIG. 5 is a system block diagram showing an embodiment of the construction of the correlation tracking processor 4-1 of the first embodiment shown in FIG. 4. The constructions of the other correlation tracking processors 4-2, . . . are the same as the construction of the correlation tracking processor 4-1, and illustration and description thereof will be omitted.

The correlation tracking processor 4-1 shown in FIG. 5 generally includes an image flow control circuit 71, a correlation computing circuit 72, a control register 73, a minimum value detection circuit 74, a correlation value accumulating circuit 75, a correlation value memory circuit 76, and image memories 12-1 through 12-3 which are connected as shown. The image flow control circuit 71 is coupled to the image input/output unit 2 shown in FIG. 4 via the video bus 3. In addition, the image flow control circuit 71 and the control register 73 are respectively coupled to the control computer 6 shown in FIG. 4 via the control bus 5.

Figure 6:
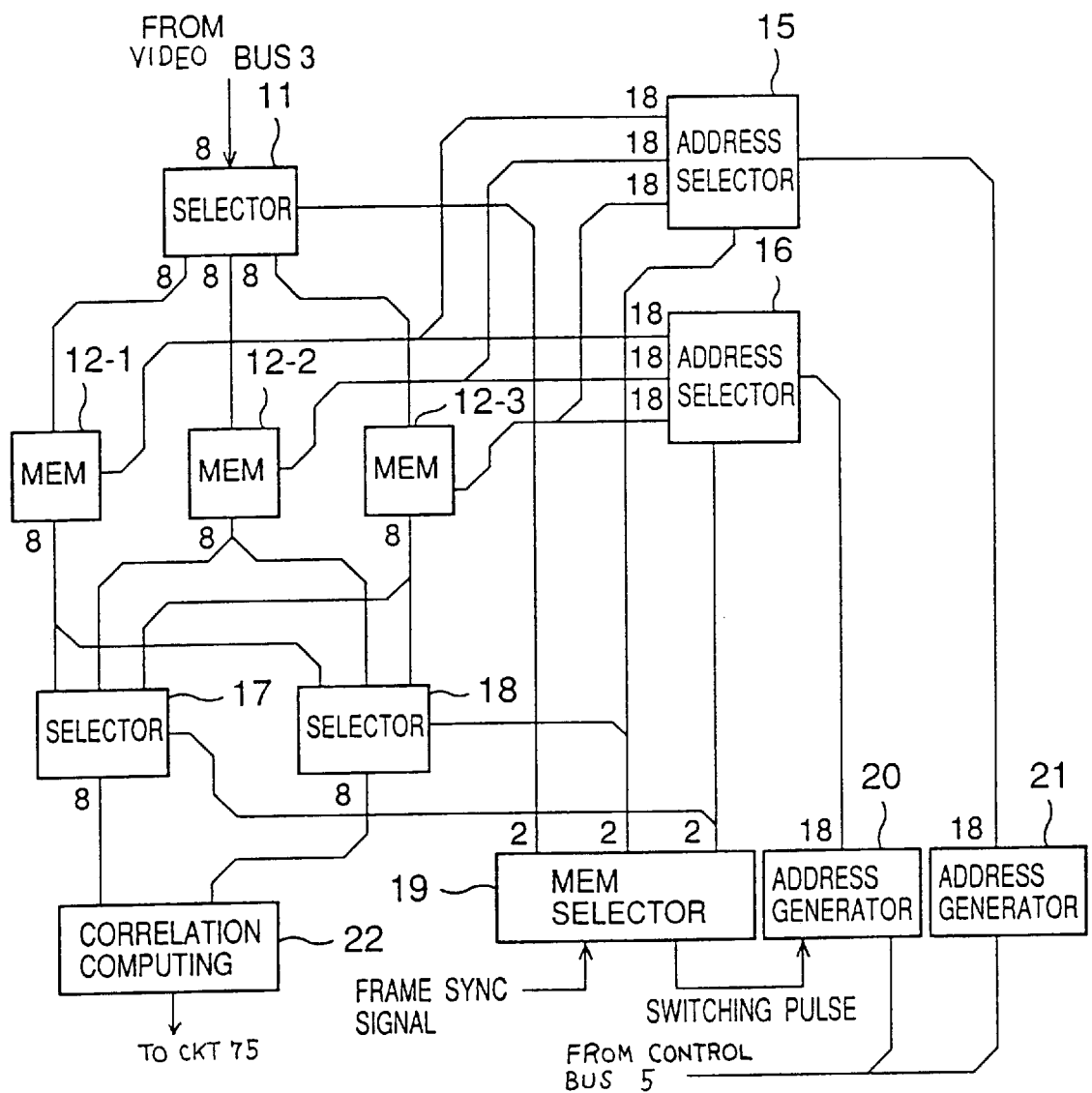
FIG. 6 is a system block diagram showing an embodiment of the construction of an image flow control circuit together with image memories and a correlation computing circuit.

FIG. 6 is a system block diagram showing the construction of an embodiment of the image flow control circuit 71 together with the image memories 12-1 through 12-3 and the correlation computing circuit 72. In FIG. 6, the image flow control circuit 71 includes selectors 11, 17 and 18, address selectors 15 and 16, a memory selector 19, a reference image address generator 20, and a search image address generator 21 which are connected as shown. In this embodiment, the 3 image memories 12-1 through 12-3 are selectively used to realize the tracking process in each frame, the input of the search image (or block) at each frame, and the updating of the reference image (or block) at arbitrary frame intervals.

The selector 11 receives an 8-bit input image data from image data signal lines of the video bus 3. The selector 11 supplies the 8-bit input image data to a selected one of the 3 image memories 12-1 through 12-3 based on a 2-bit input memory selection signal from the memory selector 19.

Figure 7:
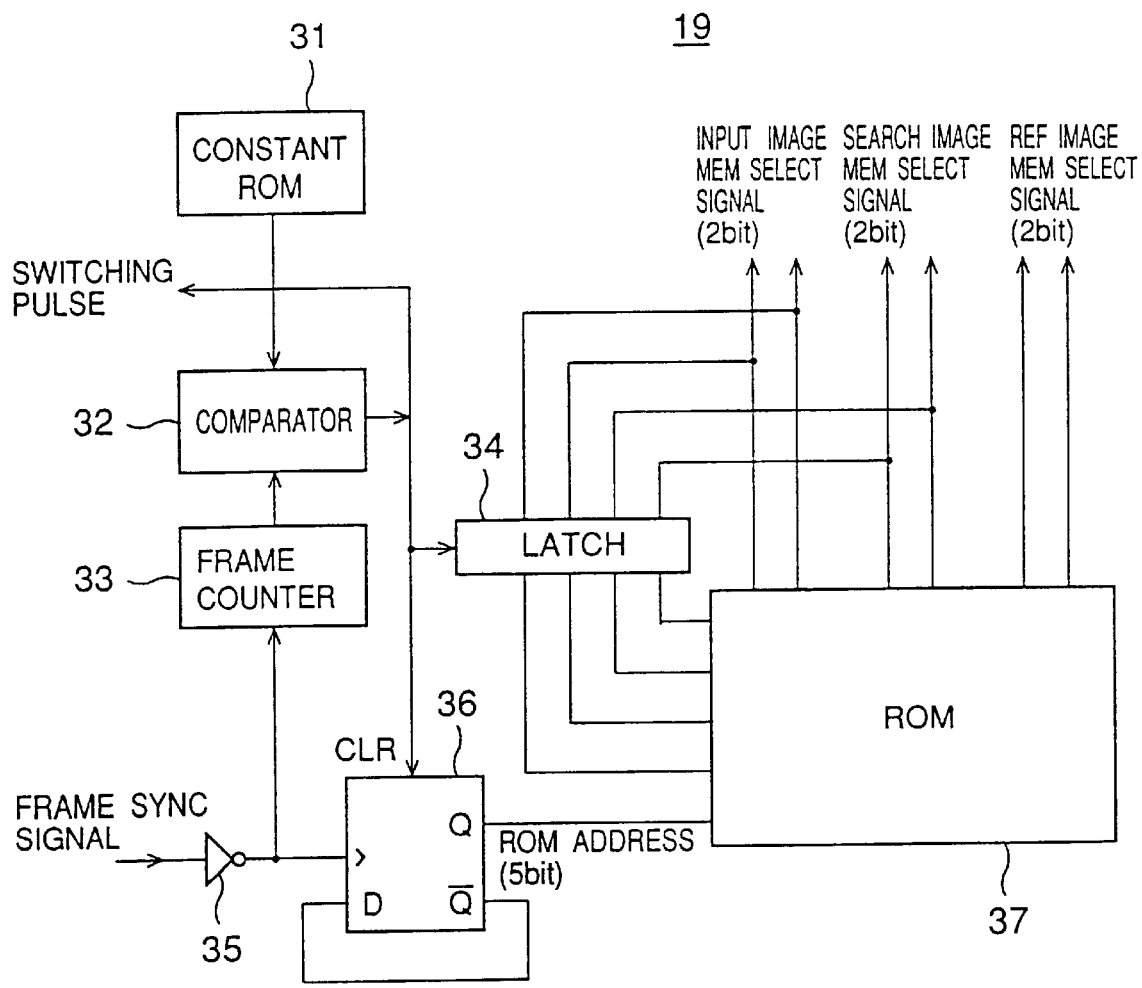
FIG. 7 is a system block diagram showing an embodiment of a memory selector.

FIG. 7 is a system block diagram showing an embodiment of the memory selector 19. In FIG. 7, the memory selector 19 includes a constant ROM 31, a comparator 32, a frame counter 33, a latch circuit 34, an inverter 35, a flip-flop 36, and a ROM 37 which are connected as shown.

The constant ROM 31 prestores constants indicating switching intervals of the reference image. On the other hand, a frame synchronizing signal obtained from a frame synchronizing signal line of the video bus 3 is passed through the inverter 35 and supplied to the frame counter 33 and to a clock input terminal of the flip-flop 36. Accordingly, the frame counter 33 counts the inverted frame synchronizing signal from the inverter 35, and supplies a counted value to the comparator 32. The comparator 32 compares the constant read from the constant ROM 31 and the counted value output from the frame counter 33, and outputs a switching pulse when the compared constant and the counted value match. This switching pulse starts switching of the reference image memory. The switching pulse is supplied to the reference image address generator 20 shown in FIG. 6, and also to the latch circuit 34 and to a clear terminal of the flip-flop 36.

A /Q-output (or inverted-Q output) of the flip-flop 36 is supplied to a data input terminal D thereof, and a Q-output of the flip-flop 36 is supplied to the ROM 37 as 1 bit out of the bits of address signal of the ROM 37. Remaining 4 bits of the address signal of the ROM 37 are supplied from the latch circuit 34. The ROM 37 prestores selection data related to the selection of the image memories 12-1 through 12-3. The selection data read from the address of the ROM 37 specified by the 5-bit address signal are output as a 2-bit input image memory selection signal, a 2-bit search image memory selection signal and a 2-bit reference image memory selection signal. The input image memory selection signal determines which one of the image memories 12-1 through 12-3 is to be used as the input image memory for storing the input image data. Similarly, the search image memory selection signal determines which one of the image memories 12-1 through 12-3 is to be used as the search image memory for storing the search image data, and the reference image memory selection signal determines which one of the image memories 12-1 through 12-3 is to be used as the reference image memory for storing the reference image data.

The 2-bit input image memory selection signal and the 2-bit search image memory selection signal are supplied to the ROM 37 as the remaining 4 bits of the address signal via the latch circuit 34. In addition, the 2-bit input image memory selection signal is supplied to the selector 11, the 2-bit search image memory selection signal is supplied to the address selector 15 and the selector 18, and the 2-bit reference image memory selection signal is supplied to the address selector 16 and the selector 17.

Figure 8:
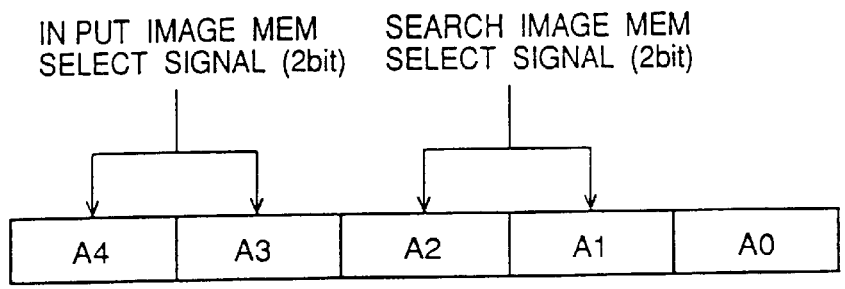
FIG. 8 is a diagram showing a 5-bit address signal which is supplied to a read only memory (ROM)

FIG. 8 is a diagram showing the 5-bit address supplied to the ROM 37. As shown in FIG. 8, the address signal is made up of bits A0 through A4. The bit A0 corresponds to the signal from the flip-flop 36. The bits A1 and A2 correspond to the 2-bit search image memory selection signal obtained via the latch circuit 34. The bits A3 and A4 correspond to the 2-bit input image memory selection signal obtained via the latch circuit 34. Depending on whether the bit A0 is "0" or "1", the image memories 12-1 through 12-3 are switched so as to alternately input the image data to the two image memories other than the image memory used as the reference image memory.

FIG. 9 is a diagram showing the relationship of the value of the 5-bit address signal (ROM address) supplied to the ROM 37, the selection data read from the ROM 37 depending on the ROM address, that is, the values of the 2-bit input image memory selection signal, the 2-bit search image memory selection signal and the 2-bit reference image memory selection signal. For example, when the value of the ROM address is "2", the value of the input image memory selection signal is "2", the value of the search image memory selection signal is "0", and the value of the reference image memory selection signal is "1". In this case, the image memory 12-1 is selected when the value of the image memory selection signal is "0", the image memory 12-2 is selected when the value of the image memory selection signal is "1", and the image memory 12-3 is selected when the value of the image memory selection signal is "2". Accordingly, when the value of the ROM address is "2", the image memory 12-3 is selected as the input image memory, the image memory 12-1 is selected as the search image memory, and the image memory 12-2 is selected as the reference image memory. In other words, the selector 11 shown in FIG. 6 selectively supplies the image data to the image memory 12-1, 12-2 or 12-3 depending on whether the value of the input image memory selection signal is "0", "1" or "2". Of course, FIG. 9 does not show all of the relationships, and only a part of the relationships is shown for the sake of convenience.

The address selector 15 shown in FIG. 6 supplies an 18-bit search image address generated from the search image address generator 21 to one of the image memories 12-1 through 12-3 that is selected as the search image memory, based on the search image memory selection signal from the memory selector 19. In addition, the address selector 16 supplies an 18-bit reference image address generated from the reference image address generator 20 to one of the image memories 12-1 through 12-3 that is selected as the reference image memory, based on the reference image memory selection signal from the memory selector 19.

The image data read from the image memories 12-1 through 12-3 are supplied to each of the selectors 17 and 18. As described above, the selector 17 receives the search image memory selection signal from the memory selector 19, and the selector 18 receives the reference image memory selection signal from the memory selector 19. Hence, out of the image data read from the image memories 12-1 through 12-3, the selectors 17 and 18 select only the search image data and the reference image data and supply these image data to the correlation computing circuit 72. The correlation computing circuit 72 obtains the correlation value by carrying out the correlation computing process. The correlation value is supplied from the correlation computing circuit 72 to the minimum value detection circuit 74 via the correlation value accumulating circuit 75, and the minimum value of the correlation value is detected by the minimum value detection circuit 74. Since the minimum value detection circuit 74 outputs an 18-bit peak position address indicating the peak position, that is, the minimum value, it is possible to track the predetermined object within the picked up image in real-time based on this peak position address. The 18-bit peak position address output from the minimum value detection circuit 74 is stored in the control register 73 as will be described later, and the peak position address can be read from and written to the control register 73 from the control computer 6 via the control bus 5. The peak position address which is read from the control register 73 by the control computer 6 is supplied to the reference image address generator 20 and the search image address generator 21 via the control bus 5.

Figure 10:
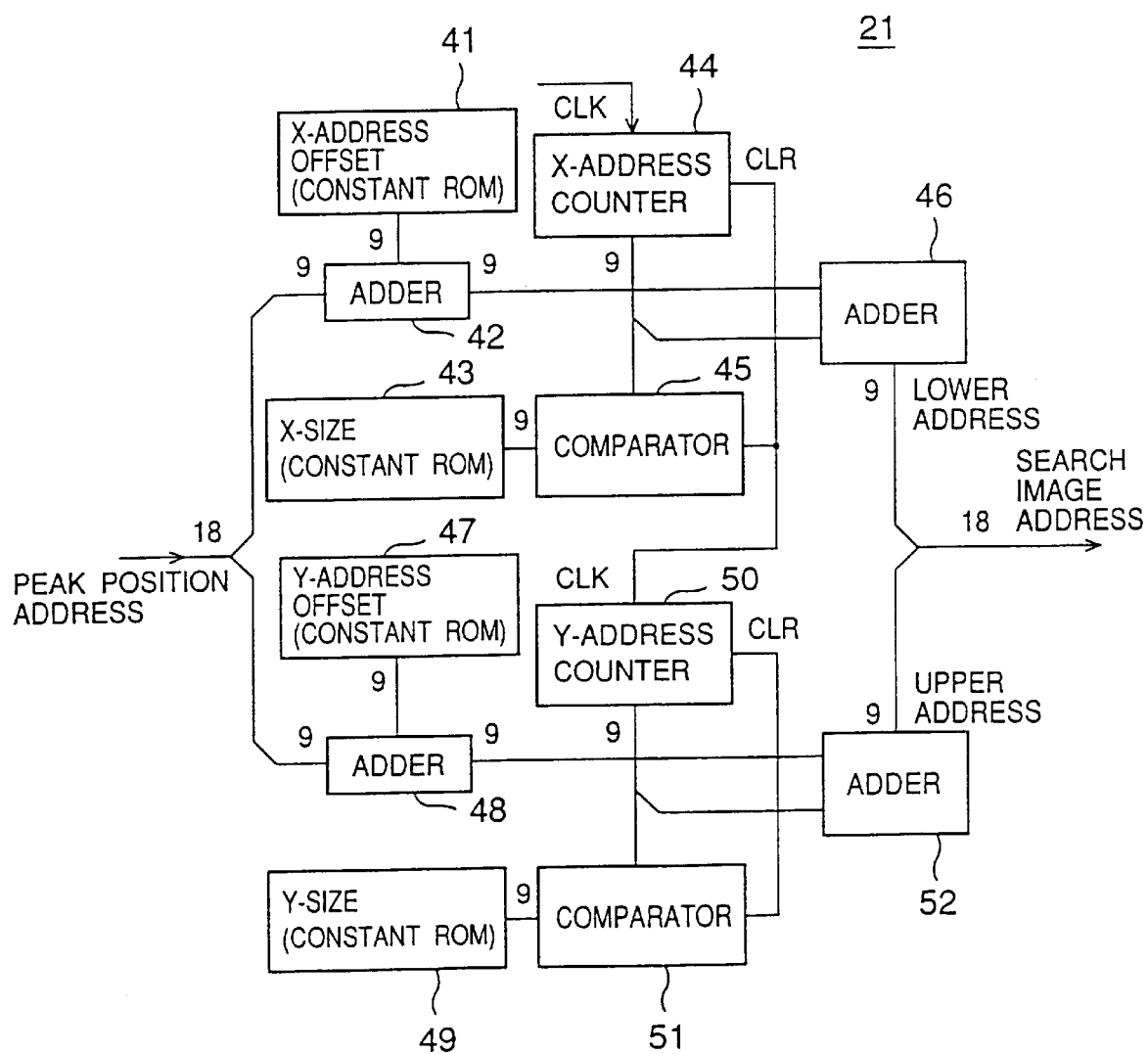
FIG. 10 is a system block diagram showing an embodiment of a search image address generator.

FIG. 10 is a system block diagram showing an embodiment of the search image address generator 21. In FIG. 10, the search image address generator 21 includes constant ROMs 41, 43, 47 and 49, adders 42, 46, 48 and 52, a X-address counter 44, comparators 45 and 51, and a Y-address counter 50 which are connected as shown.

The constant ROM 41 prestores a 9-bit X-address minimum value (offset value). The adder 42 adds a 9-bit X-address minimum value read from the constant ROM 41 and 9 bits related to the X-address of the image data out of the 18-bit peak position address from the control bus 5 shown in FIG. 6, and supplies a 9-bit added value to the adder 46. The X-address counter 44 counts the pixel clock signal obtained from a pixel clock signal line of the video bus 3, and supplies a 9-bit counted value to the adder 46 and the comparator 45. The pixel clock signal is generated in correspondence with each of the pixels (picture elements) forming the image data. On the other hand, the constant ROM 43 prestores a 9-bit X-size data. The X-size data indicates the size (or magnitude) of the search image in the direction X. The comparator 45 compares the X-size data read from the constant ROM 43 and the counted value output from the X-address counter 44, and outputs a match signal when the two compared values match. This match signal is supplied to a clear terminal of the X-address counter 44 to clear the same, and is also supplied to the Y-address counter 50.

The Y-address counter 50 counts the match signal and supplies a 9-bit counted value to the adder 52 and the comparator 51. The constant ROM 47 prestores a 9-bit Y-address minimum value (offset value). The adder 48 adds a 9-bit Y-address minimum value read from the constant ROM 47 and 9 bits related to the Y-address of the image data out of the 18-bit peak position address from the control bus 5 shown in FIG. 6, and supplies a 9-bit added value to the adder 52. The constant ROM 49 prestores a 9-bit Y-size data. The Y-size data indicates the size (or magnitude) of the search image in the direction Y. The comparator 51 compares the Y-size data read from the constant ROM 49 and the counted value output from the Y-address counter 50, and outputs a match signal when the two compared values match. This match signal is supplied to a clear terminal of the Y-address counter 50 to clear the same.

Hence, 9 bits of the lower address of the search image address are obtained from the adder 46, and 9 bits of the upper address of the search image address are obtained from the adder 52. The search image address having a total of 18 bits are obtained from the adders 46 and 52 and supplied to the address selector 15 shown in FIG. 6.

Figure 11:
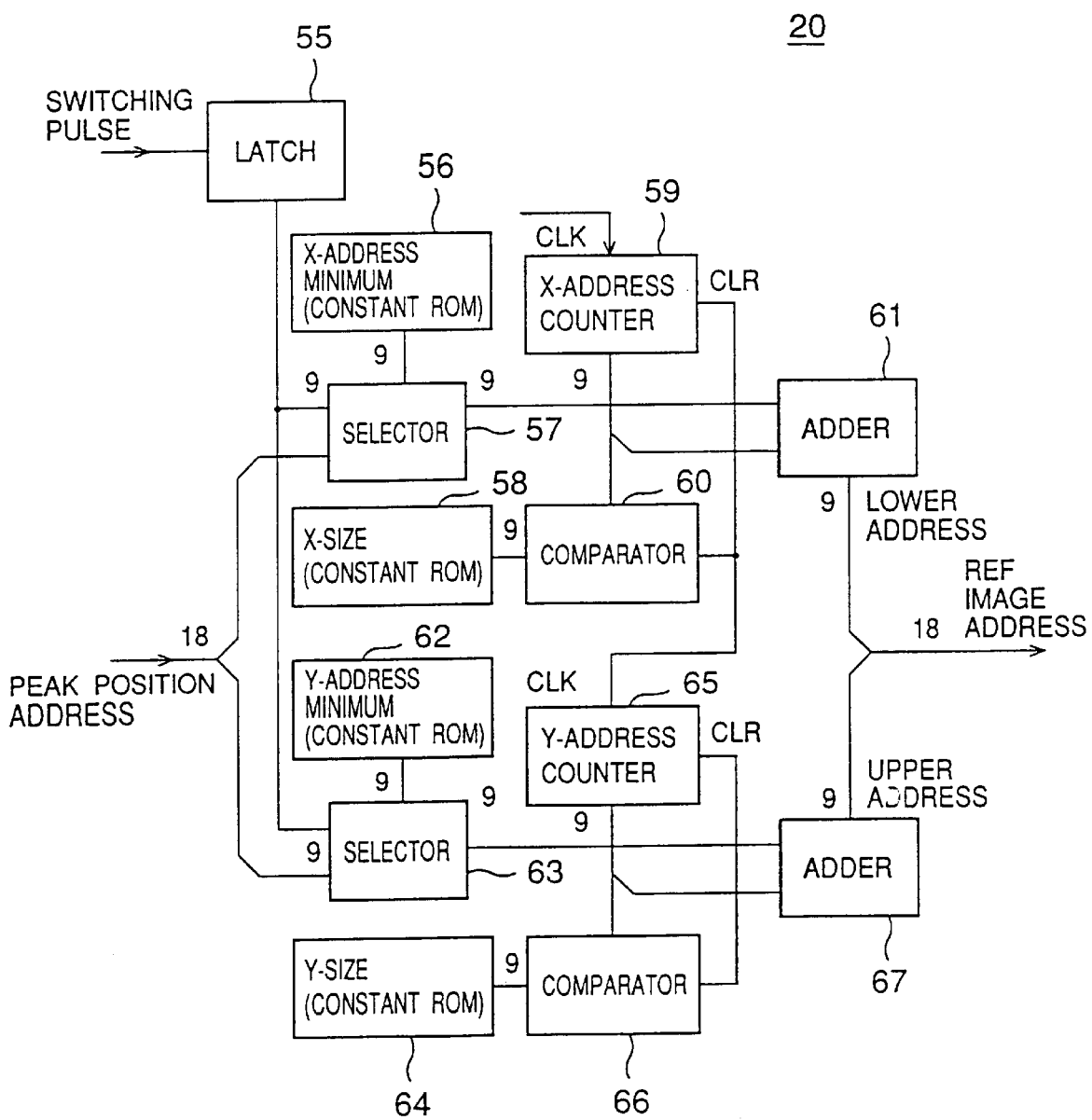
FIG. 11 is a system block diagram showing an embodiment of a reference image address generator.

FIG. 11 is a system block diagram showing an embodiment of the reference image address generator 20. In FIG. 11, the reference image address generator 20 includes a latch circuit 55, constant ROMs 56, 58, 62 and 64, selectors 57 and 63, a X-address counter 59, comparators 60 and 66, a Y-address counter 65, and adders 61 and 67 which are connected as shown.

The latch circuit 55 receives the switching pulse from the memory selector 19 shown in FIG. 6, and an output of this latch circuit 55 is supplied to the selectors 57 and 63. The constant ROM 56 prestores a 9-bit X-address minimum value, and the constant ROM 62 prestores a 9-bit Y-address minimum value. Out of the 18-bit peak position address from the control bus 5 shown in FIG. 6, 9 bits related to the X-address of the image data are supplied to the selector 57. In addition, out of the 18-bit peak position address from the control bus 5, 9 bits related to the Y-address of the image data are supplied to the selector 63. The selector 57 selectively supplies one of the X-address minimum value read from the constant ROM 56 and the X-address within the peak position address depending on the output of the latch circuit 55. The selector 63 selectively supplies one of the Y-address minimum value read from the constant ROM 62 and the Y-address within the peak position address depending on the output of the latch circuit 55.

The X-address counter 59 counts the pixel clock signal obtained from the pixel clock signal line of the video bus 3, and supplies a 9-bit counted value to the adder 61 and the comparator 60. On the other hand, the constant ROM 58 prestores the X-size in 9 bits. This X-size indicates the size (or magnitude) of the reference image in the direction X. The comparator 60 compares the X-size data read from the constant ROM 58 and the counted value output from the X-address counter 59, and outputs a match signal when the two compared values match. This match signal is supplied to a clear terminal of the X-address counter 59 to clear the same, and is also supplied to the Y-address counter 65.

The Y-address counter 65 counts the match signal, and supplies a 9-bit counted value to the adder 67 and the comparator 66. The constant ROM 64 prestores the Y-size in 9 bits. This Y-size indicates the size (or magnitude) of the reference image in the direction Y. The comparator 66 compares the Y-size data read from the constant ROM 64 and the counted value output from the Y-address counter 65, and outputs a match signal when the two compared values match. This match signal is supplied to a clear terminal of the Y-address counter 65 to clear the same.

Accordingly, 9 bits of the lower address of the reference image address are obtained from the adder 61, and 9 bits of the upper address of the reference image address are obtained from the adder 67. The reference image address having a total of 18 bits are obtained from the adders 61 and 67 and supplied to the address selector 16 shown in FIG. 6.

Therefore, when fixing the reference image and carrying out the tracking process with respect to the input image in this embodiment, one of the image memories other than the image memory selected as the reference image memory is selected as the search image memory, and the remaining one image memory is selected as the input image memory. The correlation computation in the correlation computing circuit 72 uses as the search image the newest input image the input of which is completed. In addition, by using the image memory which is used as the search image memory in the present frame as the reference image memory in the next or subsequent frames, it is possible to update the reference image. In a frame immediately after the reference image is updated, the image memory that was used as the input image memory in the previous frame is used as the search image memory, and the image memory that was used as the reference image memory in the previous frame is used as the input image memory. As a result, the 3 image memories 12-1 through 12-3 are switched and used, so that the tracking process can be carried out in each frame, the input of the search image can be made in each frame, and the reference image can be updated at arbitrary frame intervals.

Figure 12:
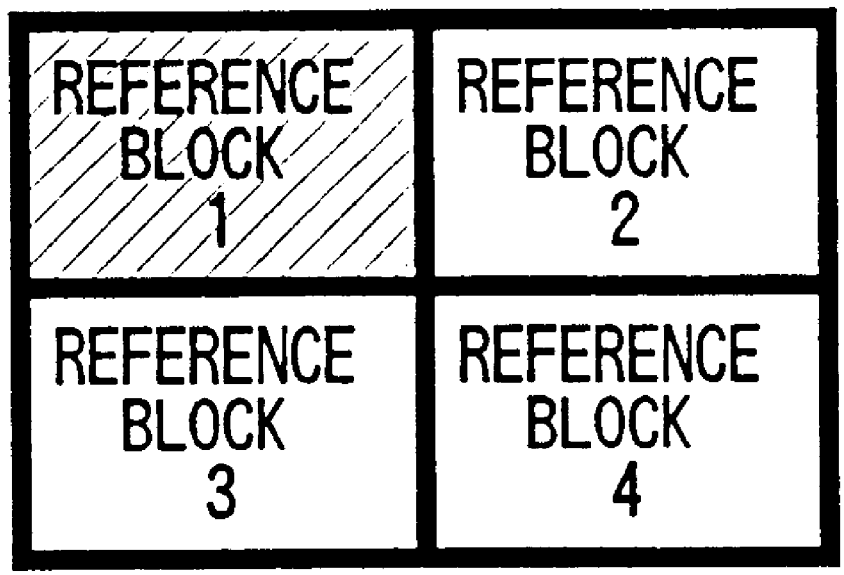
FIG. 12 is a diagram for explaining an accumulation process of correlation computation results.

Next, a description will be given of a circuit part which processes the correlation value output from the correlation computing circuit 72, by referring back to FIG. 5. In FIG. 5, the correlation accumulating circuit 75 accumulates, that is, adds, the correlation value which is output from the correlation computing circuit 72 and the correlation value which is output from the correlation computing circuit 72 during the previous computing process, depending on a control signal from the control register 73 which will be described later. When it is assumed for the sake of convenience that the correlation computing circuit 72 is capable of carrying out the correlation computation with respect to the reference block having the size of 8 pixels×8 pixels, for example, it is possible to obtain an equivalent of a correlation computation result which is obtained with respect to the reference block having the size of 16 pixels×16 pixels by accumulating the correlation computation results which are obtained at four positions shown in FIG. 12. By repeating similar accumulation processes with respect to the correlation computation results, it is possible to carry out a tracking process with respect to a reference block having the size of $8a$ pixels by $8b$ pixels, where a=1, 2, . . . and b=1, 2, 3, . . . .

The minimum value detection circuit 74 obtains a motion vector and a minimum value of the correlation value (hereinafter simply referred to as a minimum correlation value) obtained via the correlation value accumulating circuit 75, and stores the motion vector and the minimum correlation value in the control register 73. The control register 73 also stores an accumulation instruction bit having a value which indicates whether or not the correlation values are to be accumulated in the correlation value accumulating circuit 75, and this accumulation instruction bit is supplied to the correlation value accumulating circuit 75 as the control signal described above. The information within the control register 73 can be read and written by the control computer 6 via the control bus 5. The correlation value accumulating circuit 75 accumulates the correlation value output from the correlation computing circuit 72 and the previous correlation value stored in the correlation value memory circuit 76, and supplies a correlation value corresponding to the accumulation result to the minimum value detection circuit 74 and the correlation value memory circuit 76. The correlation value supplied to the correlation value memory circuit 76 is stored in the correlation value memory circuit 76, and this correlation value is read from the correlation value memory circuit 76 and is supplied to the correlation value accumulating circuit 75 as the previous correlation value when the next correlation value is output from the correlation computing circuit 72 and is supplied to the correlation value accumulating circuit 75.

Figure 13A:
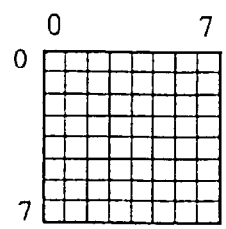
FIGS. 13A, 13B and 13C respectively are diagrams for explaining the correlation computation of the correlation computing circuit and a motion vector (u, v) for a case where a reference block having the size of 8 pixels×8 pixels is used.
Figure 13B:
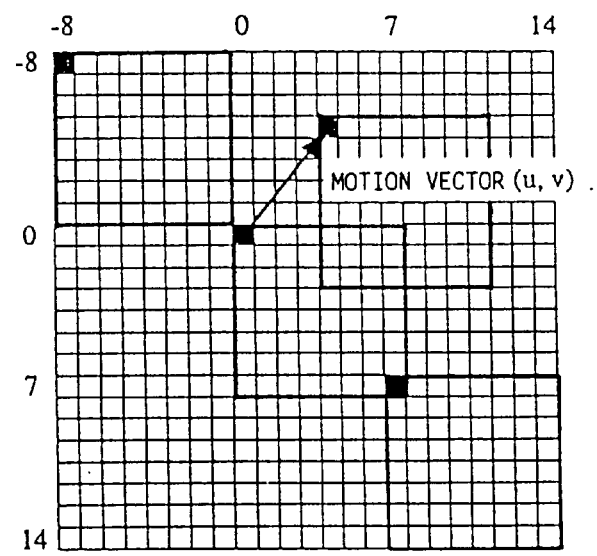
Figure 13C:
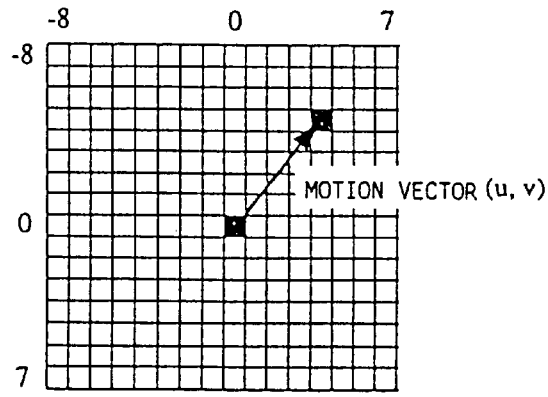

FIGS. 13A through 13C respectively are diagrams for explaining the correlation computation of the correlation computing circuit 72 and a motion vector (u, v) for a case where a reference block having the size of 8 pixels×8 pixels is used. FIG. 13A shows the reference block (or template) having the size of 8 pixels×8 pixels. FIG. 13B shows a search block having the size of 23 pixels×23 pixels which covers a search range from −8 to +7. FIG. 13C shows an arrangement of the correlation values of 16 pixels×16 pixels describing the search range from −8 to +7 together with the motion vector (u, v) for a case where the reference block shown in FIG. 13A is moved within the search block shown in FIG. 13B.

Figure 14A:
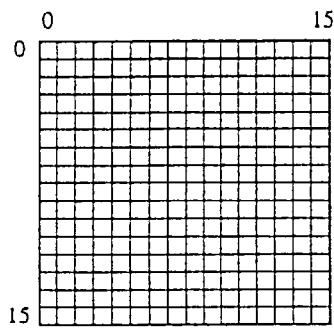
FIGS. 14A, 14B and 14C respectively are diagrams for explaining the correlation computation of the correlation computing circuit and a motion vector (u, v) for a case where a reference block having the size of 16 pixels×16 pixels is used.
Figure 14B:
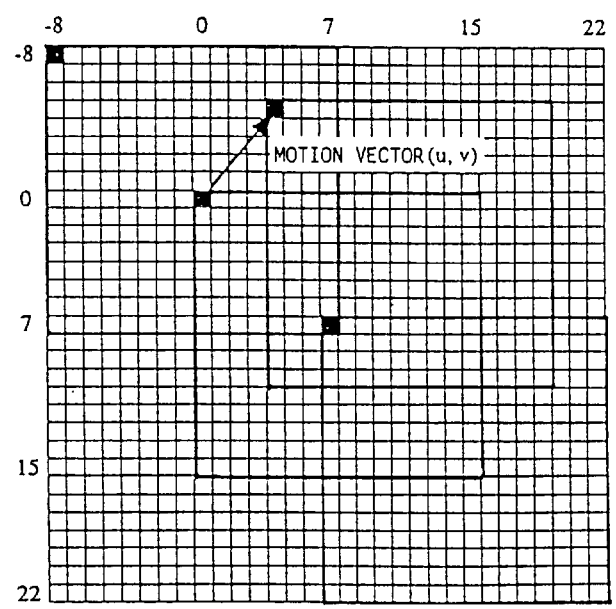
Figure 14C:
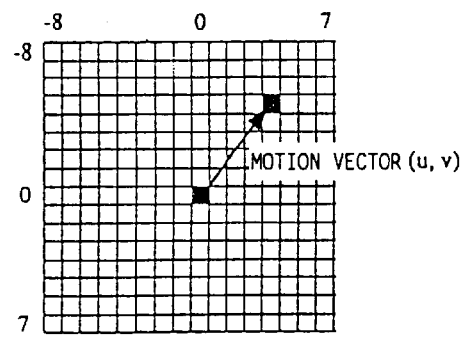

FIGS. 14A through 14C respectively are diagrams for explaining the correlation computation of the correlation computing circuit 72 and the motion vector (u, v) for a case where a reference block having the size of 16 pixels×16 pixels is used. FIG. 14A shows the reference block (or template) having the size of 16 pixels×16 pixels. FIG. 14B shows a search block having the size of 31 pixels×31 pixels which covers a search range from −8 to +7. FIG. 14C shows an arrangement of the correlation values of 16 pixels×16 pixels describing the search range from −8 to +7 together with the motion vector (u, v) for a case where the reference block shown in FIG. 14A is moved within the search block shown in FIG. 14B.

Next, a description will be given of the mechanism by which an equivalent of a reference block having the size of 16 pixels×16 pixels is realized by accumulating the correlation computation results using a reference block (or template) having the size of 8 pixels×8 pixels, by carrying out the correlation computing process in the correlation computing circuit 72 and the accumulation process in the correlation value accumulating circuit 75, with reference to FIGS. 15 through 18. In FIGS. 15A, 16A, 17A and 18A, the reference block having the size of 8 pixels×8 pixels is indicated by the rightwardly descending hatching. In addition, in FIGS. 15B, 16B, 17B and 18B, the search block having the size of 23 pixels×23 pixels is indicated by the leftwardly descending hatching.

Figure 15B:
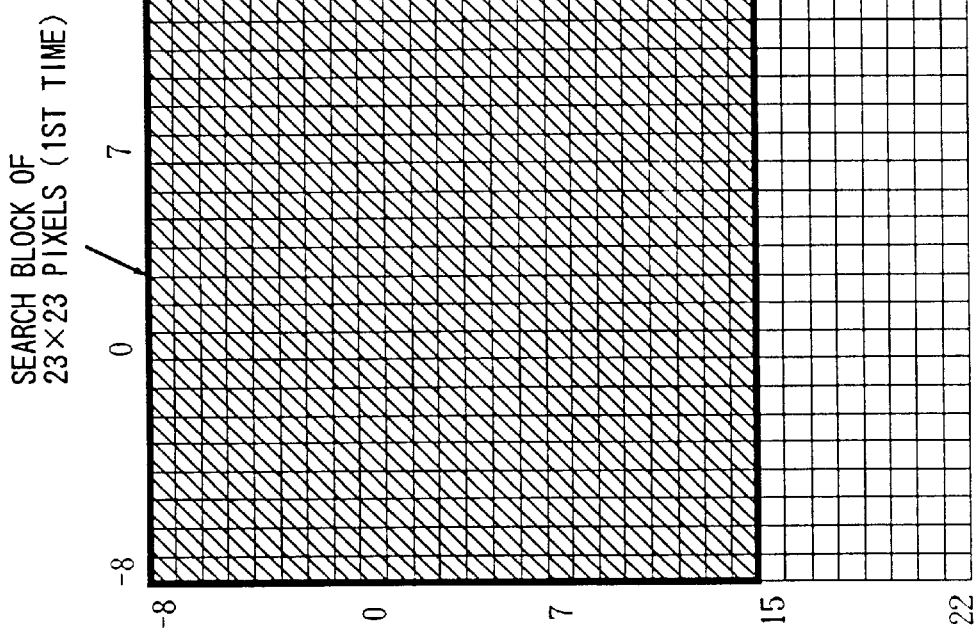
FIGS. 15A and 15B respectively are diagrams for explaining a mechanism of realizing an equivalent of a reference block having the size of 16 pixels×16 pixels by accumulating the correlation computation results which are obtained using the reference block having the size of 8 pixels×8 pixels.
Figure 15A:
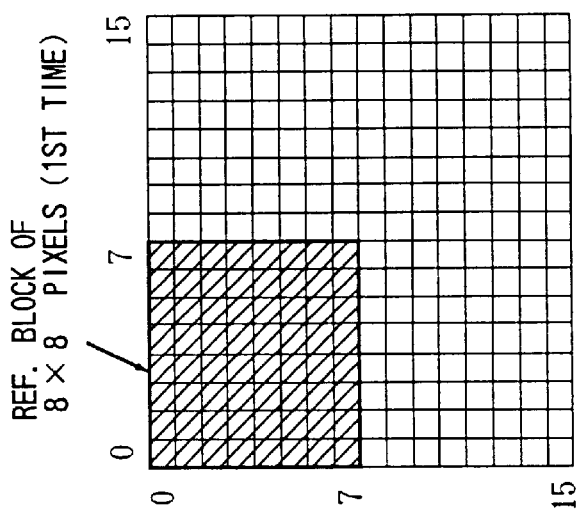

The reference block having the size of 8 pixels×8 pixels that is used when carrying out the first correlation computing process in the correlation computing circuit 72 is indicated by the hatching in FIG. 15A. The search block having the size of 23 pixels×23 pixels that is used in this case is indicated by the hatching in FIG. 15B. With respect to the correlation value which is obtained by this first correlation computing process, no previous correlation value exists. For this reason, the correlation value accumulating circuit 75 does not carry out the accumulation process with respect to the correlation value in response to the control signal from the control register 73.

Figure 16B:
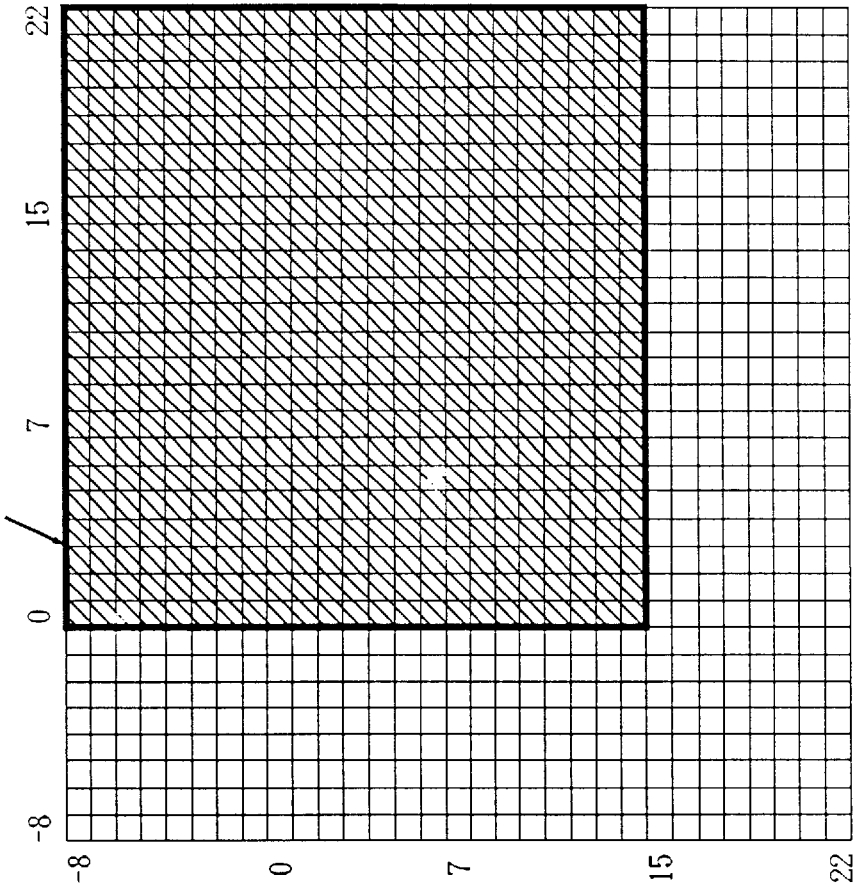
FIGS. 16A and 16B respectively are diagrams for explaining the mechanism of realizing the equivalent of the reference block having the size of 16 pixels×16 pixels by accumulating the correlation computation results which are obtained using the reference block having the size of 8 pixels×8 pixels.
Figure 16A:
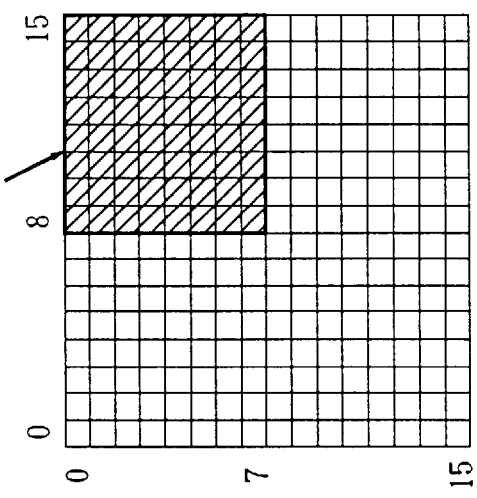

The reference block having the size of 8 pixels×8 pixels that is used when carrying out the second correlation computing process in the correlation computing circuit 72 is indicated by the hatching in FIG. 16A. The search block having the size of 23 pixels×23 pixels that is used in this case is indicated by the hatching in FIG. 16B. With respect to the correlation value which is obtained by this second correlation computing process, the previous correlation value exists. This previous correlation value is obtained by the first correlation computing process described above. Hence, the correlation value accumulating circuit 75 carries out the accumulation process with respect to the correlation values in response to the control signal from the control register 73.

Figure 17B:
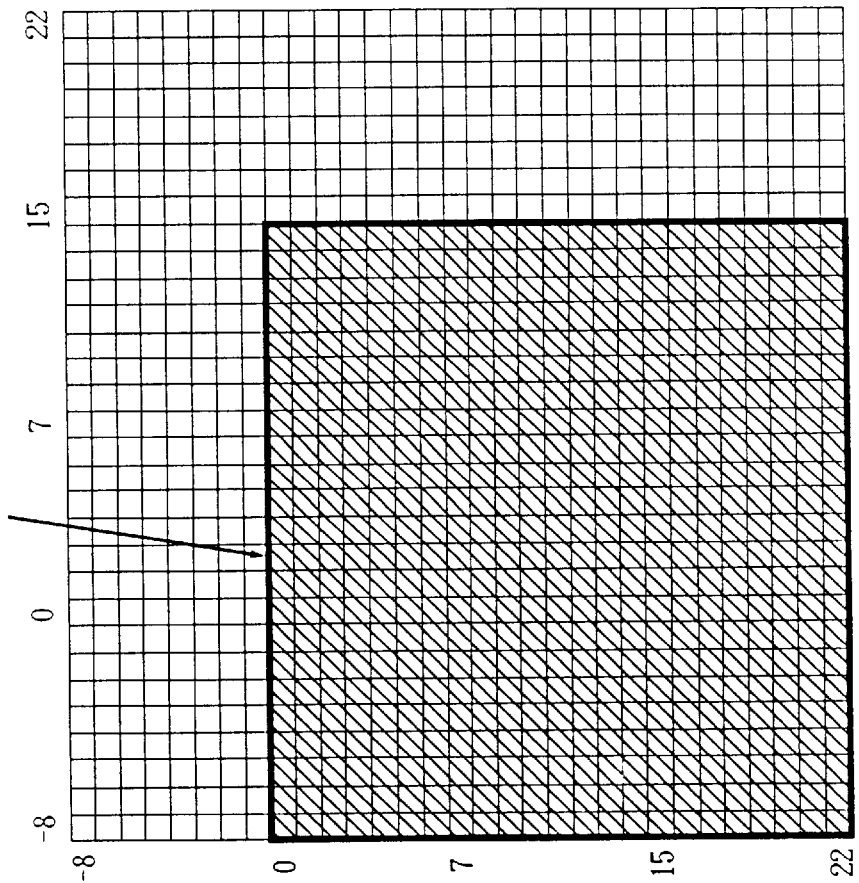
FIGS. 17A and 17B respectively are diagrams for explaining the mechanism of realizing the equivalent of the reference block having the size of 16 pixels×16 pixels by accumulating the correlation computation results which are obtained using the reference block having the size of 8 pixels×8 pixels.
Figure 17A:
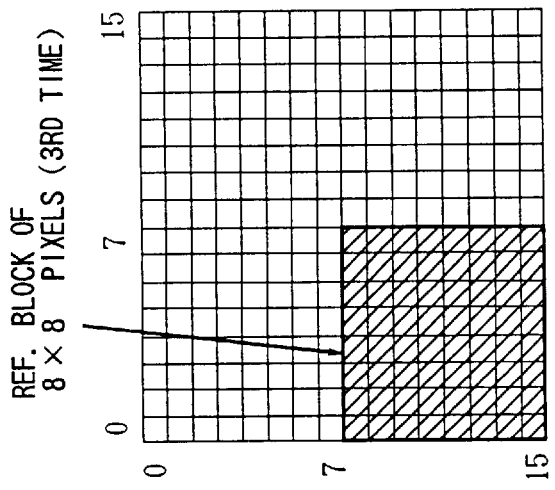

The reference block having the size of 8 pixels×8 pixels that is used when carrying out the third correlation computing process in the correlation computing circuit 72 is indicated by the hatching in FIG. 17A. The search block having the size of 23 pixels×23 pixels that is used in this case is indicated by the hatching in FIG. 17B. With respect to the correlation value which is obtained by this third correlation computing process, the previous correlation value exists. This previous correlation value is obtained by the second correlation computing process described above. Hence, the correlation value accumulating circuit 75 carries out the accumulation process with respect to the correlation values in response to the control signal from the control register 73.

Furthermore, the reference block having the size of 8 pixels×8 pixels that is used when carrying out the fourth correlation computing process in the correlation computing circuit 72 is indicated by the hatching in FIG. 18A. The search block having the size of 23 pixels×23 pixels that is used in this case is indicated by the hatching in FIG. 18B. With respect to the correlation value which is obtained by this fourth correlation computing process, the previous correlation value exists. This previous correlation value is obtained by the third correlation computing process described above. Hence, the correlation value accumulating circuit 75 carries out the accumulation process with respect to the correlation values in response to the control signal from the control register 73.

By the above described accumulation process, it is possible to realize the equivalent of the reference block having the size of 16 pixels×16 pixels by use of the reference block having the size of 8 pixels×8 pixels. In general, it is possible to carry out a tracking process with respect to an equivalent of a reference block having the size of am pixels×bn pixels by use of a reference block having the size of m pixels×n pixels, where a=1, 2, 3, . . . and b=1, 2, 3, . . . , by repeating similar accumulation processes with respect to the correlation computation results.

Figure 19:
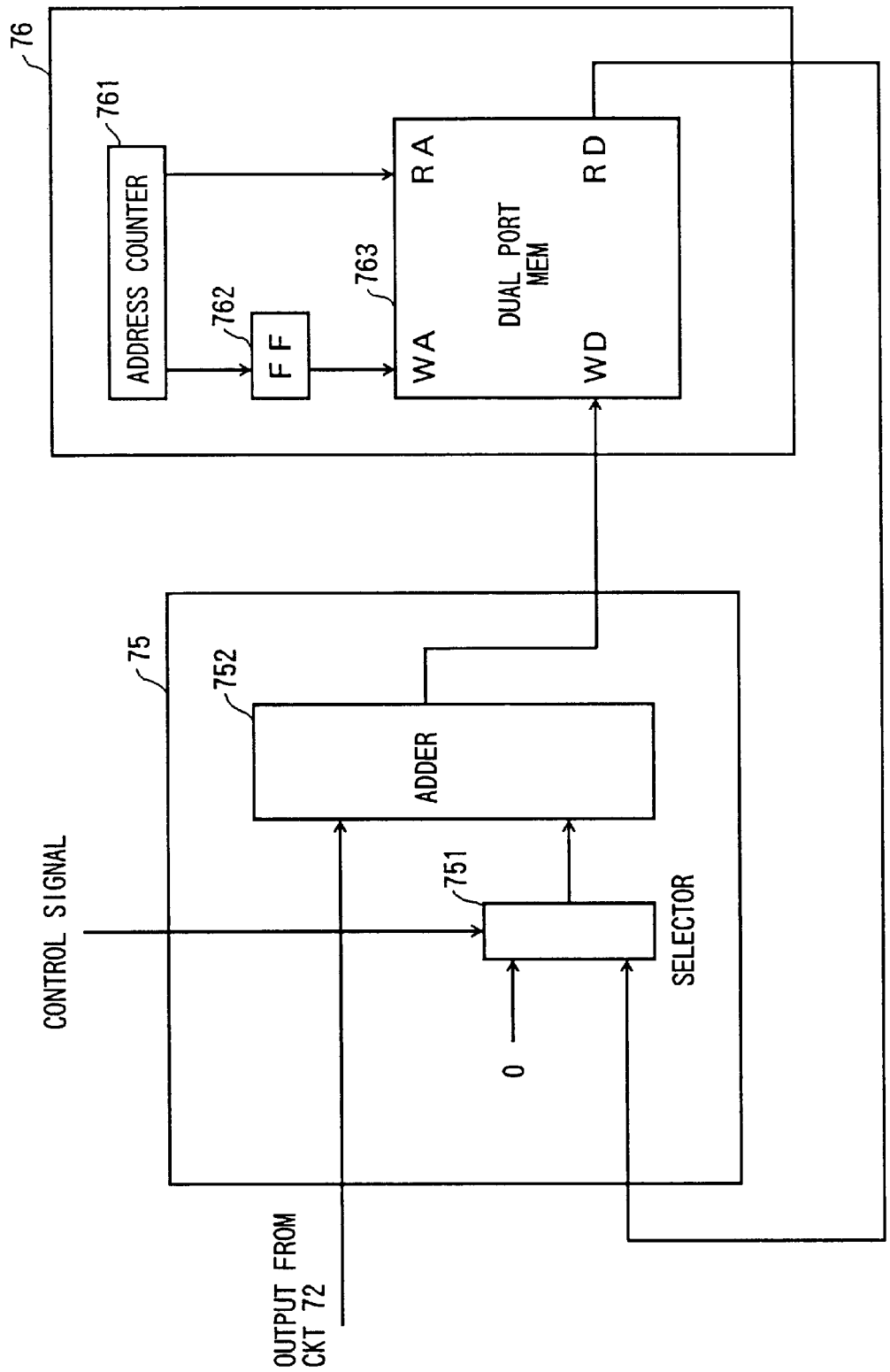
FIG. 19 is a system block diagram showing an embodiment of the construction of a correlation value accumulating circuit and a correlation value memory circuit.

FIG. 19 is a system block diagram showing an embodiment of the construction of the correlation value accumulating circuit 75 and the correlation value memory circuit 76. In FIG. 19, the correlation value accumulating circuit 75 includes a selector 751 and an adder 752 which are connected as shown. On the other hand, the correlation value memory circuit 76 includes an address counter 761, a flip-flop circuit 762 and a dual port memory 763 which are connected as shown.

The selector 751 of the correlation value accumulating circuit 75 receives a fixed value "0", and the correlation value (read data) which is obtained by the previous correlation computation process and is read via a read terminal RD of the dual port memory 763 within the correlation value memory circuit 76. The selector 751 selectively outputs one of the fixed value "0" and the correlation value (read data) in response to the control signal from the control register 73 shown in FIG. 5. The adder 752 adds the output of the selector 751 and the correlation value which is output from the correlation computing circuit 72 shown in FIG. 5, and supplies an added result (write data) to a write terminal WD of the dual port memory 763 within the correlation value memory circuit 76. In addition, although not shown in FIG. 19, the write data is also supplied to the minimum value detection circuit 74 shown in FIG. 5. The address counter 761 of the correlation value memory circuit 76 counts the pixel clock or the like, and outputs a write address and a read address of the dual port memory 763. The write address from the address counter 761 is supplied to a write address terminal WA of the dual port memory 763 via the flip-flop circuit 762 which is provided to delay the timing of the write address by several pixel clocks, for example. On the other hand, the read address from the address counter 761 is supplied directly to a read address terminal RA of the dual port memory 763.

Figure 20:
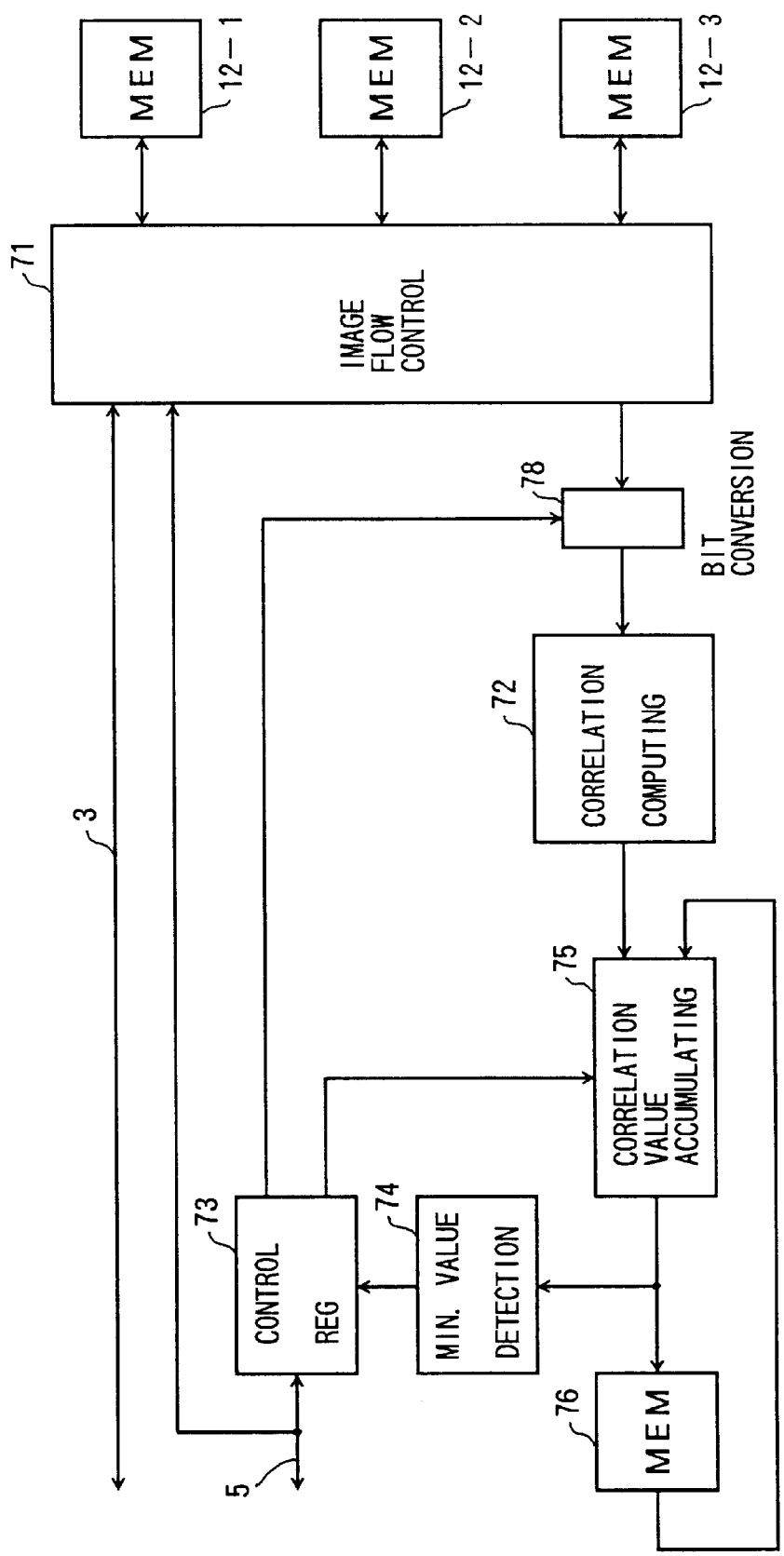
FIG. 20 is a system block diagram showing an embodiment of the correlation tracking processor in a second embodiment of the local region image tracking apparatus according to the present invention.

Next, a description will be given of a second embodiment of the local region image tracking apparatus according to the present invention. The general construction of the second embodiment is the same as that of the first embodiment shown in FIG. 4, and illustration and description thereof will be omitted. In the second embodiment, the construction of the correlation tracking processor 4-1 is different from that of the first embodiment. FIG. 20 is a system block diagram showing an embodiment of the correlation tracking processor 4-1 of the second embodiment. In FIG. 20, those parts which are the same as those corresponding parts in FIG. 5 are designated by the same reference numerals, and a description thereof will be omitted.

As shown in FIG. 20, a bit conversion circuit 78 is provided between the image flow control circuit 71 and the correlation value computing circuit 72 in this embodiment, so that it is possible carry out the correlation computation process with respect to a color image. The bit conversion circuit 78 carries out a bit conversion process with respect to color image data obtained from the image flow control circuit 71, based on a bit conversion instruction signal from the control register 73.

Figure 21:
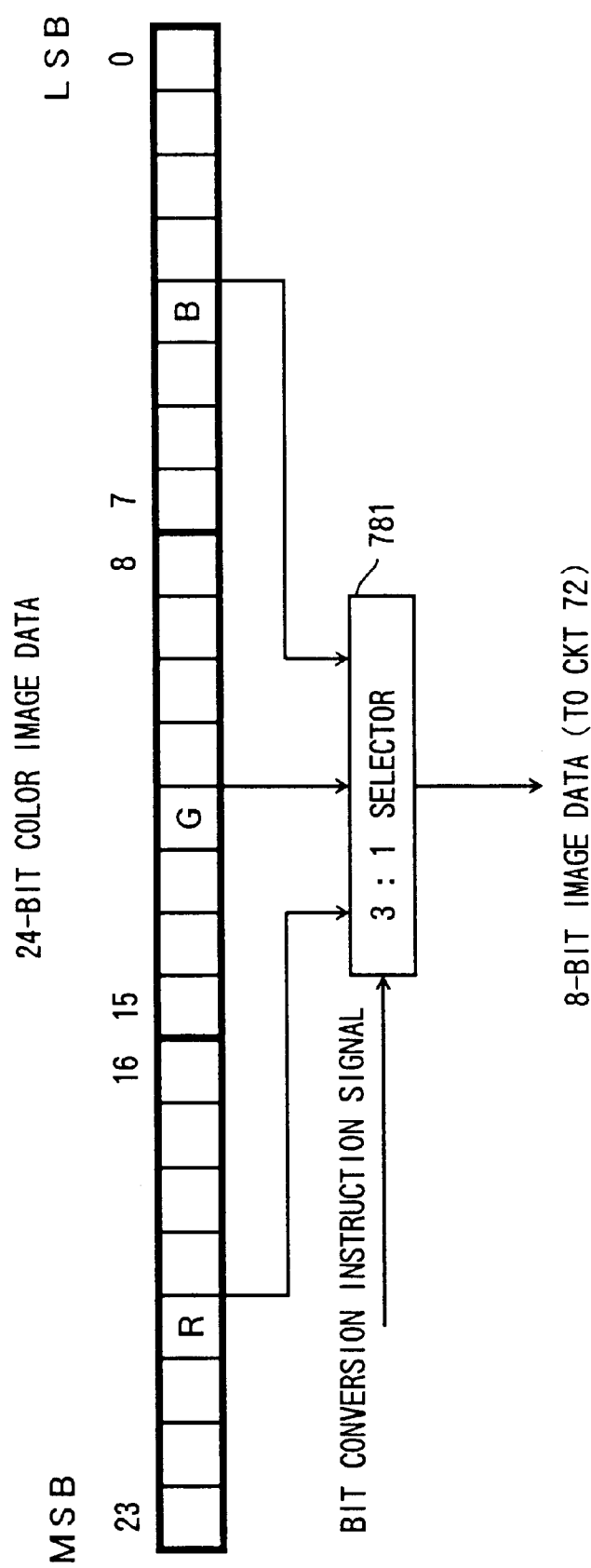
FIG. 21 is a diagram showing an embodiment of a bit conversion circuit.

FIG. 21 is a diagram showing an embodiment of the bit conversion circuit 78. For the sake of convenience, it is assumed that a 24-bit RGB signal makes up the color image data. In this case, a 3:1 selector 781 outputs upper 8 bits of the RGB signal, middle 8 bits of the RGB signal or the lower 8 bits of the RGB signal, and supplies the selected 8 bits of the RGB signal to the correlation computing circuit 72 shown in FIG. 20. The correlation computing circuit 72 first selects the R signal, that is, image data related to the red (R), and carries out the correlation computation process with respect to this R signal. The correlation value accumulating circuit 75 does not carry out the accumulation process on the correlation value with respect to the R signal. Next, the correlation computing circuit 72 selects the G signal, that is, image data related to the green (G), and carries out the correlation computation process with respect to this G signal. The correlation value accumulating circuit 75 carries out the accumulation process on the correlation value with respect to the G signal by accumulating the correlation value with respect to the R signal to the correlation value with respect to the G signal. Furthermore, the correlation computing circuit 72 selects the B signal, that is, image data related to the blue (B), and carries out the correlation computation process with respect to this B signal. The correlation value accumulating circuit 75 carries out the accumulation process on the correlation value with respect to the B signal by accumulating the accumulated correlation value with respect to the R and G signals to the correlation value with respect to the B signal. By carrying out a total of three correlation computation processes with respect to the same reference image position and search image position in the above described manner, it is possible to realize the tracking process with respect to a motion within the color image.

Figure 22:
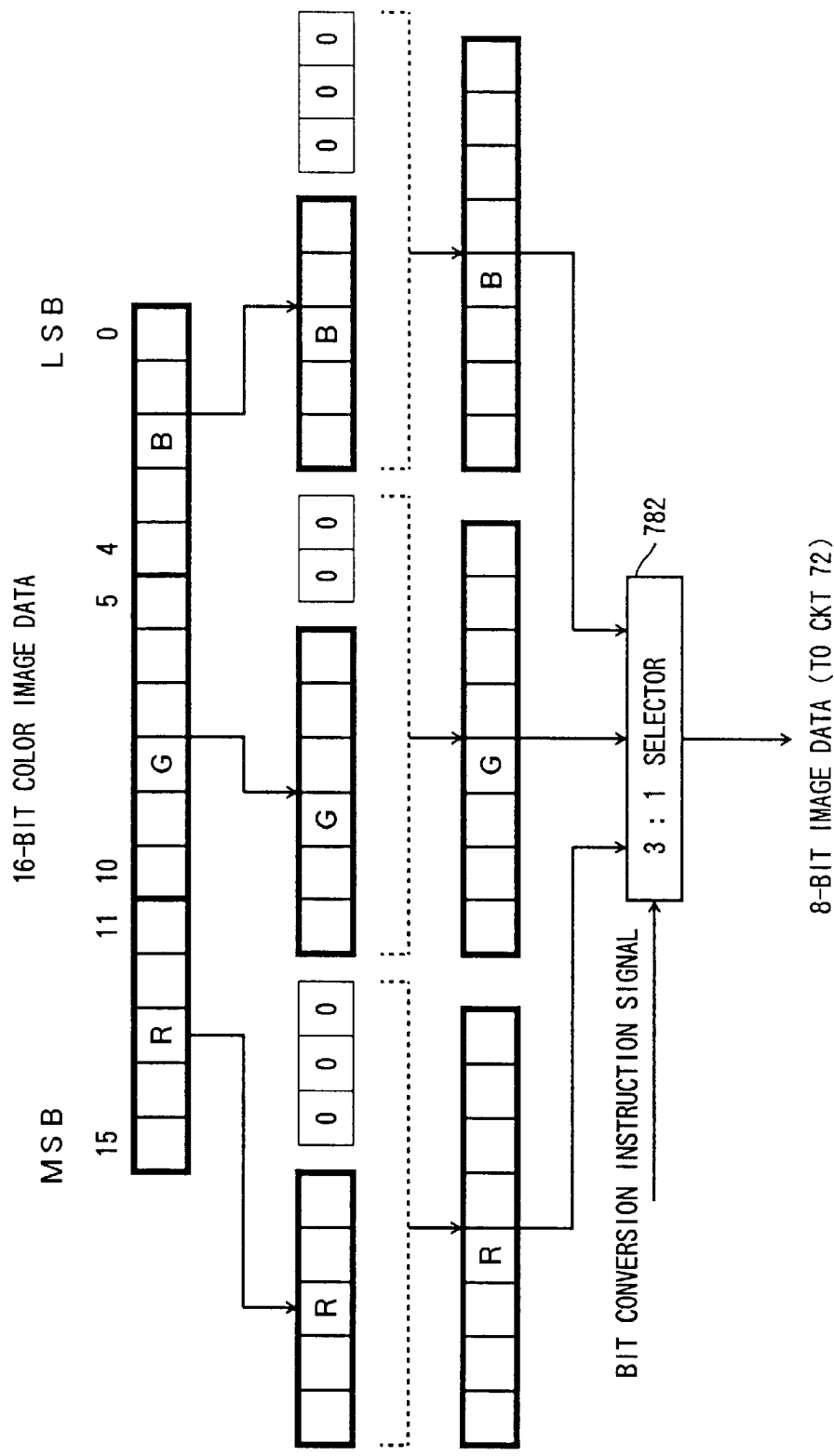
FIG. 22 is a diagram showing another embodiment of the bit conversion circuit.

FIG. 22 is a diagram showing another embodiment of the bit conversion circuit 78. For the sake of convenience, it is assumed that a 16-bit RGB signal makes up the color image data. When the R signal has 5 bits, the G signal has 6 bits and the B signal has 5 bits, the bits of each color signal are used as upper bits of an 8-bit data and remaining lower bits of the 8-bit data are fixed to a value "0" before being supplied to a 3:1 selector 782. The 3:1 selector 782 selectively outputs one of the three 8-bit data (color signal) formed from the RGB signal, and supplies the selected 8-bit data to the correlation computing circuit 72 shown in FIG. 20. In this case, the correlation computing circuit 72 first selects the R signal, that is, image data related to the red (R), and carries out the correlation computation process with respect to this R signal. The correlation value accumulating circuit 75 does not carry out the accumulation process on the correlation value with respect to the R signal. Next, the correlation computing circuit 72 selects the G signal, that is, image data related to the green (G), and carries out the correlation computation process with respect to this G signal. The correlation value accumulating circuit 75 carries out the accumulation process on the correlation value with respect to the G signal by accumulating the correlation value with respect to the R signal to the correlation value with respect to the G signal. Furthermore, the correlation computing circuit 72 selects the B signal, that is, image data related to the blue (B), and carries out the correlation computation process with respect to this B signal. The correlation value accumulating circuit 75 carries out the accumulation process on the correlation value with respect to the B signal by accumulating the accumulated correlation value with respect to the R and G signals to the correlation value with respect to the B signal. By carrying out a total of three correlation computation processes with respect to the same reference image position and search image position in the above described manner, it is possible to realize the tracking process with respect to a motion within the color image.

Figure 23:
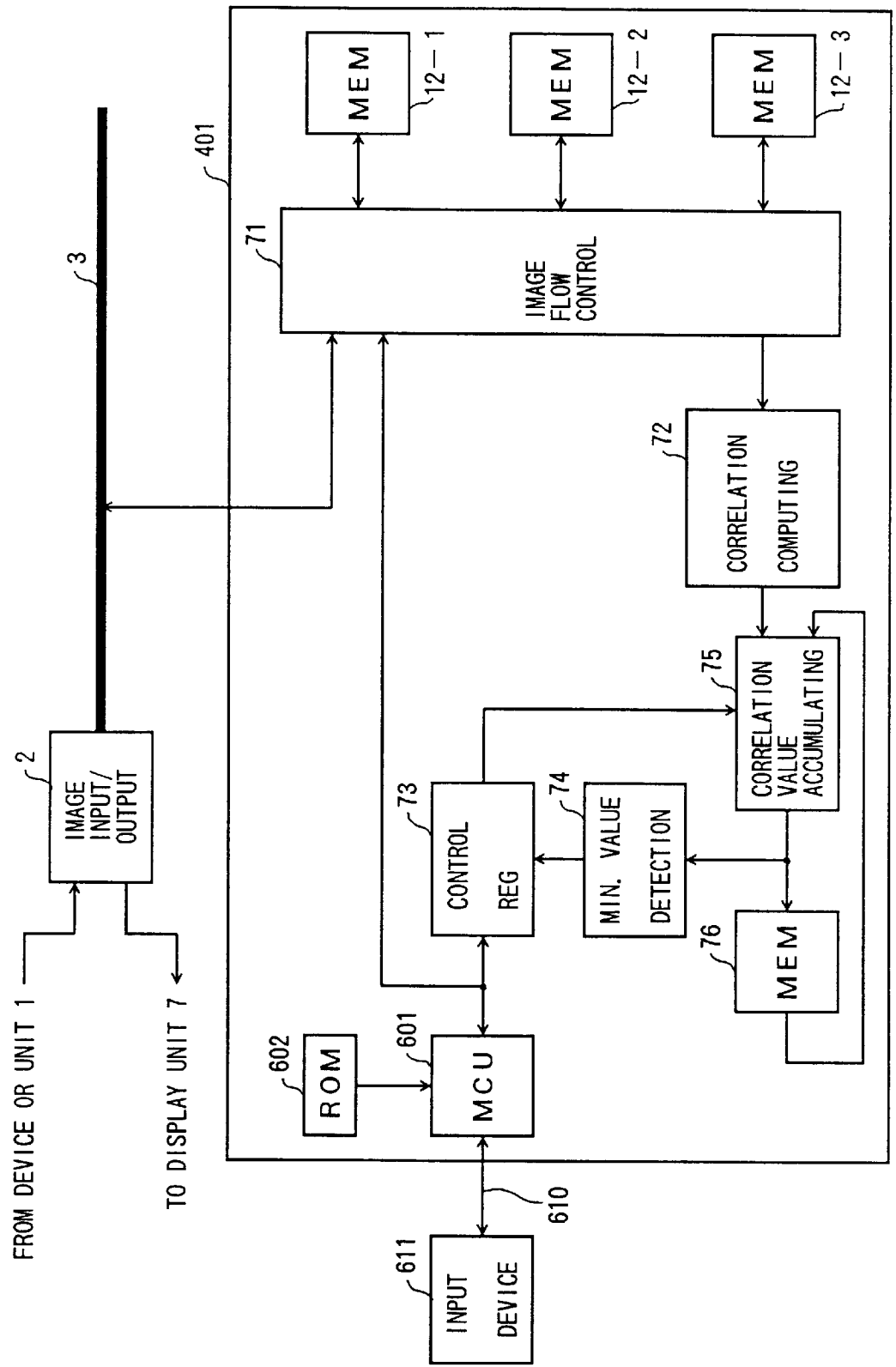
FIG. 23 is a system block diagram showing the general construction of a third embodiment of the local region image tracking apparatus according to the present invention.

Next, a description will be given of a third embodiment of the local region image tracking apparatus according to the present invention, by referring to FIG. 23. FIG. 23 is a system block diagram showing the general construction of the third embodiment. In FIG. 23, those parts which are the same as those corresponding parts in FIGS. 4 and 5 are designated by the same reference numerals, and a description thereof will be omitted.

In this embodiment, a microcomputer unit (MCU) 601 corresponding to the control computer 6 shown in FIG. 4 is provided within a correlation tracking processor 401. For this reason, the control bus 5 shown in FIG. 4 is not provided in this embodiment. In addition, a ROM 602 for storing programs to be executed by the MCU 601, data to be used by the programs and the like is coupled to the MCU 601. As shown in FIG. 23, instructions are supplied to the MCU 601 from an input device 611 such as a keyboard via an interface 610.

In this embodiment, the correlation tracking processor 401 is constructed as a single unit.

Figure 24:
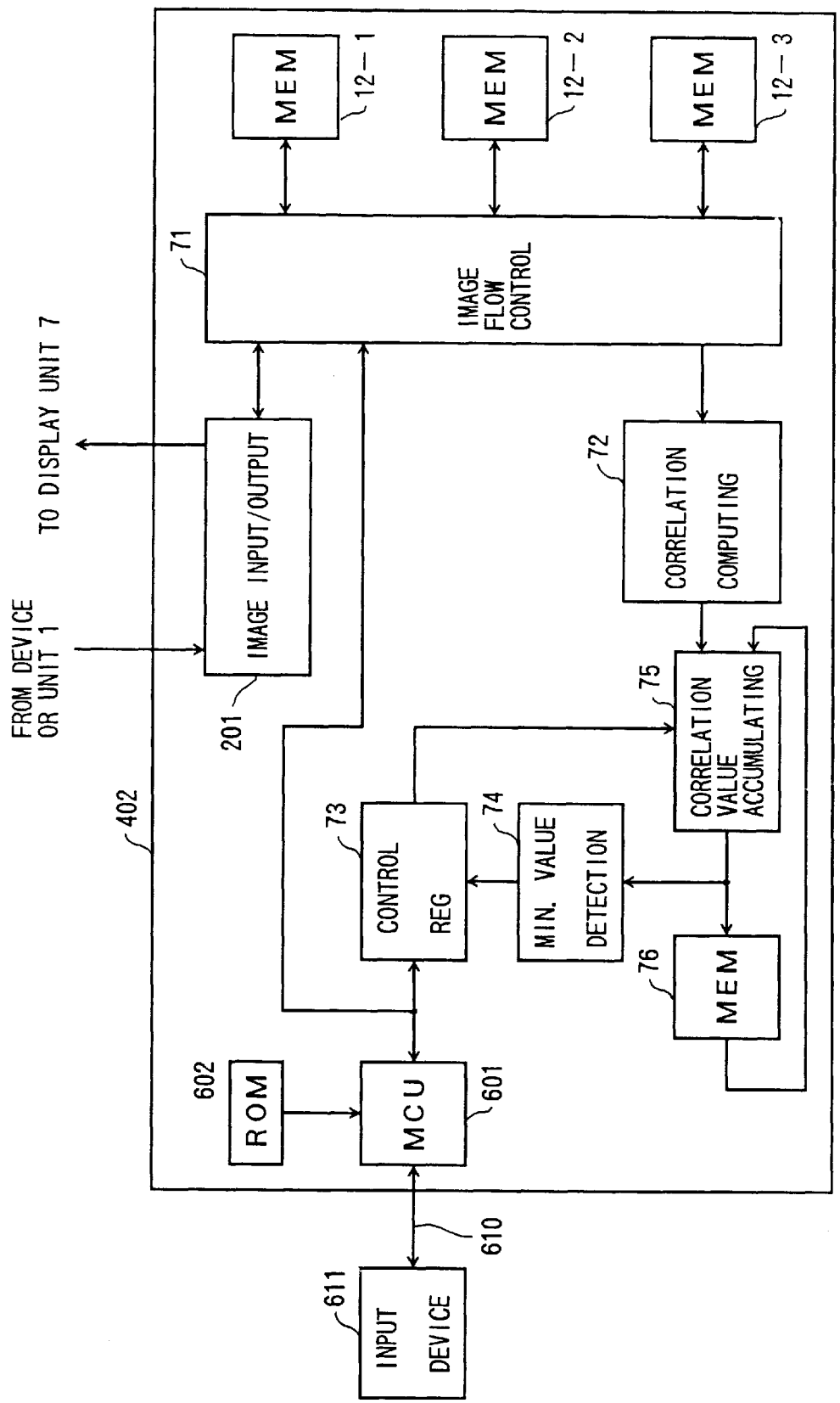
FIG. 24 is a system block diagram showing the general construction of a fourth embodiment of the local region image tacking apparatus according to the present invention.

Next, a description will be given of a fourth embodiment of the local region image tracking apparatus according to the present invention, by referring to FIG. 24. FIG. 24 is a system block diagram showing the general construction of the fourth embodiment. In FIG. 24, those parts which are the same as those corresponding parts in FIG. 23 are designated by the same reference numerals, and a description thereof will be omitted.

In this embodiment, an image input/output circuit 201 corresponding to the image input/output unit 2 shown in FIG. 4 is also provided within a correlation tracking processor 402, in addition to the MCU 601 and the ROM 602. For this reason, the video bus 3 shown in FIG. 4 is not provided in this embodiment.

In this embodiment, the correlation tracking processor 402 is also constructed as a single unit. Hence, it is possible to realize the local region image tracking apparatus at a relatively low cost by simply connecting the input device 611, the image pickup device 1 and the display unit 7 to the correlation tracking processor 402.

Further, the present invention is not limited to these embodiments, but various variations and modifications may be made without departing from the scope of the present invention.

What is claimed is:

1. A local region image tracking apparatus for continuously tracking an arbitrary local region within a search image, defined by search image data of a size greater than am by bn pixels, by comparing the search image data of the search image and reference image data, related to the arbitrary local region and of a size of am by bn pixels, where a, b, m and n are natural numbers, a>1 and b>1, said local region image tracking apparatus comprising:

correlation computing means for computing a correlation between each of plural sub-reference images comprising respective contiguous portions of a common reference image and defined by respective sub-reference image data, each of a size of m by n pixels, while moving said sub-reference images in individual succession from initial contiguous positions to subsequent contiguous positions thereof with respect to said search image, and for outputting plural correlation values respectively indicating respective, computed correlations between each of the plural, moved sub-reference images and corresponding portions of said search image; and correlation value accumulating means for accumulating the plural correlation values output from said correlation computing means, and for outputting a correlation value indicative of a correlation between said search image data and reference image data related to an equivalent of a reference image having a size of am by bn pixels.

2. The local region image tracking apparatus as claimed in claim 1, wherein said input image data are input from an input means selected from a group consisting of an image pickup means and an image storage means via a video bus, said correlation computing means and said correlation value accumulating means form a correlation tracking processor, and one or a plurality of correlation tracking processors are coupled in parallel to said input means via said video bus.

3. The local region image tracking apparatus as claimed in claim 2, further comprising:

a control computer controlling said one or plurality of correlation tracking processors, said one or plurality of correlation tracking processors being coupled in parallel to said control computer via a control bus.

4. The local region image tracking apparatus as claimed in claim 1, said correlation value accumulating means comprising:

a correlation value memory to store a correlation value output from said correlation computing means as a result of a previous correlation computation; and a correlation value accumulating circuit to obtain an accumulated correlation value by adding a correlation value output from said correlation computing means as a result of a present correlation computation and the correlation value stored in said correlation value memory.

5. The local region image tracking apparatus as claimed in claim 1, said input image data comprising color image data, and said local region image tracking apparatus further comprising:

data conversion means for successively supplying color image data to said correlation computing means with respect to a reference image position and a corresponding search image position, and said correlation value accumulating means further comprising accumulating correlation values of the color image data with respect to the corresponding reference image position and search image position.

6. The local region image tracking apparatus as claimed in claim 1, further comprising:

a microcomputer unit to control whether to accumulate the correlation values in said correlation value accumulating means, wherein said correlation computing means, said correlation value accumulating means and said microcomputer unit form a single unit.

7. The local region image tracking apparatus as claimed in claim 1, wherein said input image data are input from an input means selected from a group consisting of an image pickup means and an image storage means, said input image data are displayed on a display means, and said local region image tracking apparatus further comprises:

image input/output means, coupled to the input means and the display means, for receiving said input image data from the input means, wherein said correlation computing means, said correlation value accumulating means and said image input/output means forming a single unit.

8. The local region image tracking apparatus as claimed in claim 7, further comprising:

a microcomputer unit to control whether to accumulate the correlation values in said correlation value accumulating means, wherein said correlation computing means, said correlation value accumulating means, said image input/output means and said microcomputer unit forming a single unit.

9. The local region image tracking apparatus as claimed in claim 2, wherein said correlation value accumulating means comprises:

a correlation value memory to store a correlation value output from said correlation computing means as a result of a previous correlation computation; and a correlation value accumulating circuit to obtain an accumulated correlation value by adding a correlation value output from said correlation computing means as a result of a present correlation computation and the correlation value stored in said correlation value memory.

10. The local region image tracking apparatus as claimed in claim 3, wherein said correlation value accumulating means comprises:

a correlation value memory to store a correlation value output from said correlation computing means as a result of a previous correlation computation; and a correlation value accumulating circuit to obtain an accumulated correlation value by adding a correlation value output from said correlation computing means as a result of a present correlation computation and the correlation value stored in said correlation value memory.

11. The local region image tracking apparatus as claimed in claim 2, said input image data comprising color image data, and said local region image tracking apparatus further comprising:

data conversion means for successively supplying color image data to said correlation computing means with respect to a reference image position and a corresponding search image position, and said correlation value accumulating means further comprising accumulating correlation values of the color image data with respect to the corresponding reference image position and search image position.

12. The local region image tracking apparatus as claimed in claim 3, said input image data comprising color image data, and said local region image tracking apparatus further comprising:

data conversion means for successively supplying color image data to said correlation computing means with respect to a reference image position and a corresponding search image position, and said correlation value accumulating means further comprising accumulating correlation values of the color image data with respect to the corresponding reference image position and search image position.

13. The local region image tracking apparatus as claimed in claim 4, said input image data comprising color image data, and said local region image tracking apparatus further comprising:

data conversion means for successively supplying color image data to said correlation computing means with respect to a reference image position and a corresponding search image position, and said correlation value accumulating means further comprising accumulating correlation values of the color image data with respect to the corresponding reference image position and search image position.

14. A local region image tracking apparatus for continuously tracking an arbitrary local region within a search image, comprising:

correlation computing means for computing a correlation between reference image data of an m×n pixel reference image and search image data of said search image while moving portions of said reference image containing respective portions of the reference image data, in succession from respective, initial and contiguously related positions thereof by a common distance and in a common direction, to respective, subsequent and contiguously related positions thereof with respect to said search image, and for outputting correlation values respectively indicating a computed correlation of each moved portion of the reference image data and the corresponding portion of the search image data; and correlation value accumulating means for accumulating the respective correlation values output from said correlation computing means, and for outputting a correlation value indicative of a correlation between said search image data and said correlated reference image data related to an equivalent of a reference image having a size of am×bn pixels, wherein a, b, m, and n are natural numbers and a>1 and b>1.

15. A local region image tracking apparatus for continuously tracking an arbitrary local region within a search image, comprising:

correlation computing means for computing a correlation between plural reference sub-images, each of an m by n pixel data size, in which sub-images the reference image data is distributed, and respective, corresponding portions of a search image larger than am by bn pixels, wherein a, b, m and n are natural numbers and a>1 and b>1, by moving the plural reference sub-images and the respective, corresponding portions of the reference data distributed therein, individually and in succession, from initial contiguously related respective positions to subsequent contiguously related respective positions cumulatively encompassing the entirety of the search image and for outputting correlation values respectively indicating computed correlations at corresponding said initial and subsequent positions; and correlation value accumulating means for accumulating the correlation values output from said correlation computing means, and for outputting a correlation value indicative of a correlation between said search image data and said reference image data related to an equivalent of a reference image having a size of am by bn pixels.

* * * * *